(12) United States Patent
Ono et al.

(10) Patent No.: US 10,883,180 B2
(45) Date of Patent: Jan. 5, 2021

(54) ELECTROCHEMICAL REACTION DEVICE

(71) Applicant: KABUSHIKI KAISHA TOSHIBA, Minato-ku (JP)

(72) Inventors: Akihiko Ono, Kita (JP); Takuya Hongo, Yokohama (JP); Masakazu Yamagiwa, Yokohama (JP); Yuki Kudo, Yokohama (JP); Satoshi Mikoshiba, Yamato (JP); Norihiro Yoshinaga, Yokohama (JP); Yuta Kanai, Fuchu (JP); Jun Tamura, Chuo (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 92 days.

(21) Appl. No.: 15/915,390

(22) Filed: Mar. 8, 2018

(65) Prior Publication Data

US 2019/0085470 A1    Mar. 21, 2019

(30) Foreign Application Priority Data

Sep. 20, 2017   (JP) .................................. 2017-180391

(51) Int. Cl.
  *C25B 1/06*   (2006.01)
  *C25B 9/12*   (2006.01)
  (Continued)

(52) U.S. Cl.
  CPC ................ *C25B 1/06* (2013.01); *C08L 27/18* (2013.01); *C25B 1/00* (2013.01); *C25B 9/08* (2013.01);
  (Continued)

(58) Field of Classification Search
  CPC .......... C25B 1/06; C25B 1/00; C25B 11/035; C25B 9/08; C25B 9/12; C25B 15/00;
  (Continued)

(56) References Cited

U.S. PATENT DOCUMENTS

| 4,921,586 A | 5/1990 | Molter |
| 6,042,959 A | 3/2000 | Debe et al. |

(Continued)

FOREIGN PATENT DOCUMENTS

| JP | 58-59072 A | 4/1983 |
| JP | 59-062351 | 4/1984 |

(Continued)

OTHER PUBLICATIONS

Extended European Search Report dated Oct. 29, 2018 in corresponding European Patent Application No. 18160680.7, 10 pages.

(Continued)

*Primary Examiner* — Louis J Rufo

(74) *Attorney, Agent, or Firm* — Oblon, McClelland, Maier & Neustadt, L.L.P.

(57) ABSTRACT

An electrochemical reaction device, comprises: an anode to oxidize a first substance; a first flow path facing on the anode and through which a liquid containing the first substance flows; a cathode to reduce a second substance; a second flow path facing on the cathode and through which a gas containing the second substance flows; a porous separator provided between the anode and the cathode; and a power supply connected to the anode and the cathode. A thickness of the porous separator is 1 μm or more and 500 μm or less. An average fine pore size of the porous separator is larger than 0.008 μm and smaller than 0.45 μm. A porosity of the porous separator is higher than 0.5.

15 Claims, 7 Drawing Sheets

(51) Int. Cl.

| | |
|---|---|
| *C08L 27/18* | (2006.01) |
| *H01M 2/16* | (2006.01) |
| *C25B 9/08* | (2006.01) |
| *C25B 13/08* | (2006.01) |
| *C25B 15/00* | (2006.01) |
| *C25B 1/00* | (2006.01) |
| *C25B 11/03* | (2006.01) |
| *C01B 32/40* | (2017.01) |
| *C25B 3/04* | (2006.01) |

(52) U.S. Cl.
CPC .............. *C25B 9/12* (2013.01); *C25B 11/035* (2013.01); *C25B 13/08* (2013.01); *C25B 15/00* (2013.01); *H01M 2/162* (2013.01); *C01B 32/40* (2017.08); *C08L 2203/20* (2013.01); *C25B 3/04* (2013.01)

(58) Field of Classification Search
CPC .......... C25B 13/08; C25B 3/04; H01M 2/162; C08L 27/18; C08L 2203/20; C01B 32/40
See application file for complete search history.

(56) References Cited

U.S. PATENT DOCUMENTS

| | | | |
|---|---|---|---|
| 6,423,194 | B1 | 7/2002 | Furuya |
| 9,181,625 | B2 | 11/2015 | Masel et al. |
| 2012/0292199 | A1 | 11/2012 | Deguchi et al. |
| 2013/0146446 | A1* | 6/2013 | Wang ........................ C25B 3/04 204/230.2 |
| 2014/0131217 | A1 | 5/2014 | Buschmann |
| 2016/0164120 | A1 | 6/2016 | Swiegers et al. |
| 2016/0168732 | A1 | 6/2016 | Swiegers et al. |
| 2016/0211527 | A1 | 7/2016 | Swiegers et al. |
| 2016/0211528 | A1 | 7/2016 | Swiegers et al. |
| 2016/0226090 | A1 | 8/2016 | Sone et al. |
| 2017/0114468 | A1 | 4/2017 | Buschmann |
| 2017/0183789 | A1 | 6/2017 | Matthews et al. |
| 2017/0292198 | A1 | 10/2017 | Mitsushima et al. |
| 2018/0073155 | A1* | 3/2018 | Suzuki .................... C25B 13/08 |
| 2018/0138517 | A1 | 5/2018 | Swiegers et al. |

FOREIGN PATENT DOCUMENTS

| | | | |
|---|---|---|---|
| JP | 2001520446 | 10/2001 | |
| JP | 5017499 | 9/2012 | |
| JP | 2015-54994 | 3/2015 | |
| JP | 2016-98410 | 5/2016 | |
| WO | WO 2012/118065 A1 | 9/2012 | |
| WO | WO 2013/183584 A1 | 12/2013 | |
| WO | WO-2013183584 A1 * | 12/2013 | ............. C25B 13/08 |
| WO | WO 2014/119208 A1 | 8/2014 | |
| WO | WO-2014119208 A1 * | 8/2014 | ............. C25B 13/08 |
| WO | 2016-039999 | 3/2016 | |
| WO | 2016 065286 | 4/2016 | |
| WO | WO 2016/148302 A1 | 9/2016 | |
| WO | WO-2016148302 A1 * | 9/2016 | ............. C25B 13/08 |

OTHER PUBLICATIONS

Zengcai Liu, et al. "Electrochemical generation of syngas from water and carbon dioxide at industrially important rates" Journal of $CO_2$ Utilization, vol. 15, 2016, pp. 7.

Office Action as received in corresponding JP Patent Application No. P2017-180391 dated Mar. 5, 2020 w/English Translation.

* cited by examiner

ELECTROCHEMICAL REACTION DEVICE

CROSS REFERENCE TO RELATED APPLICATION

This application is based upon and claims the benefit of priority from Japanese Patent Application No. 2017-180391, filed on Sep. 20, 2017; the entire contents of which are incorporated herein by reference.

FIELD

Embodiments described herein generally relate to an electrochemical reaction device.

BACKGROUND

In recent years, from the viewpoints of both energy problems and environmental problems, not only converting the renewable energy such as sunlight into the electric energy to utilize it, but also converting it into a storable and conveyable state is highly desired. In response to this demand, research and development on an artificial photosynthesis technology that produces chemical substances using the sunlight like the photosynthesis by plants are in progress. This technology also creates a possibility of storing the renewable energy as a storable fuel, and further, produces chemical substances to be industrial raw materials, and thereby, creation of value is also promising.

As an electrochemical reaction device which electrochemically converts sunlight into chemical substances, there has been known, for example, a two-electrode type device which includes a cathode having a reduction catalyst to reduce carbon dioxide ($CO_2$) and an anode having an oxidation catalyst to oxidize water ($H_2O$) and in which these electrodes are immersed in water in which carbon dioxide is dissolved. The electrodes are electrically connected to each other via an electric wire or the like. In the anode, $H_2O$ is oxidized by light energy to obtain oxygen ($\frac{1}{2}O_2$) and to obtain a potential. In the cathode, by obtaining the potential from the anode, carbon dioxide is reduced to produce formic acid (HCOOH) or the like. However, when carbon dioxide dissolved in an aqueous solution is reduced by a catalyst, there is a problem that efficiency is not improved due to low solubility of carbon dioxide.

DETAILED DESCRIPTION

An electrochemical reaction device, comprises: an anode to oxidize a first substance; a first flow path facing on the anode and through which a liquid containing the first substance flows; a cathode to reduce a second substance; a second flow path facing on the cathode and through which a gas containing the second substance flows; a porous separator provided between the anode and the cathode; and a power supply connected to the anode and the cathode. A thickness of the porous separator is 1 µm or more and 500 µm or less. An average fine pore size of the porous separator is larger than 0.008 µm and smaller than 0.45 µm. A porosity of the porous separator is higher than 0.5.

Hereinafter, there will be explained an embodiment with reference to the drawings. Note that the drawings are schematic and, for example, dimensions such as thickness and width of components may differ from actual dimensions of the components. Besides, in the embodiment, substantially the same components are denoted by the same reference signs and the description thereof will be omitted in some cases.

Figure 1:
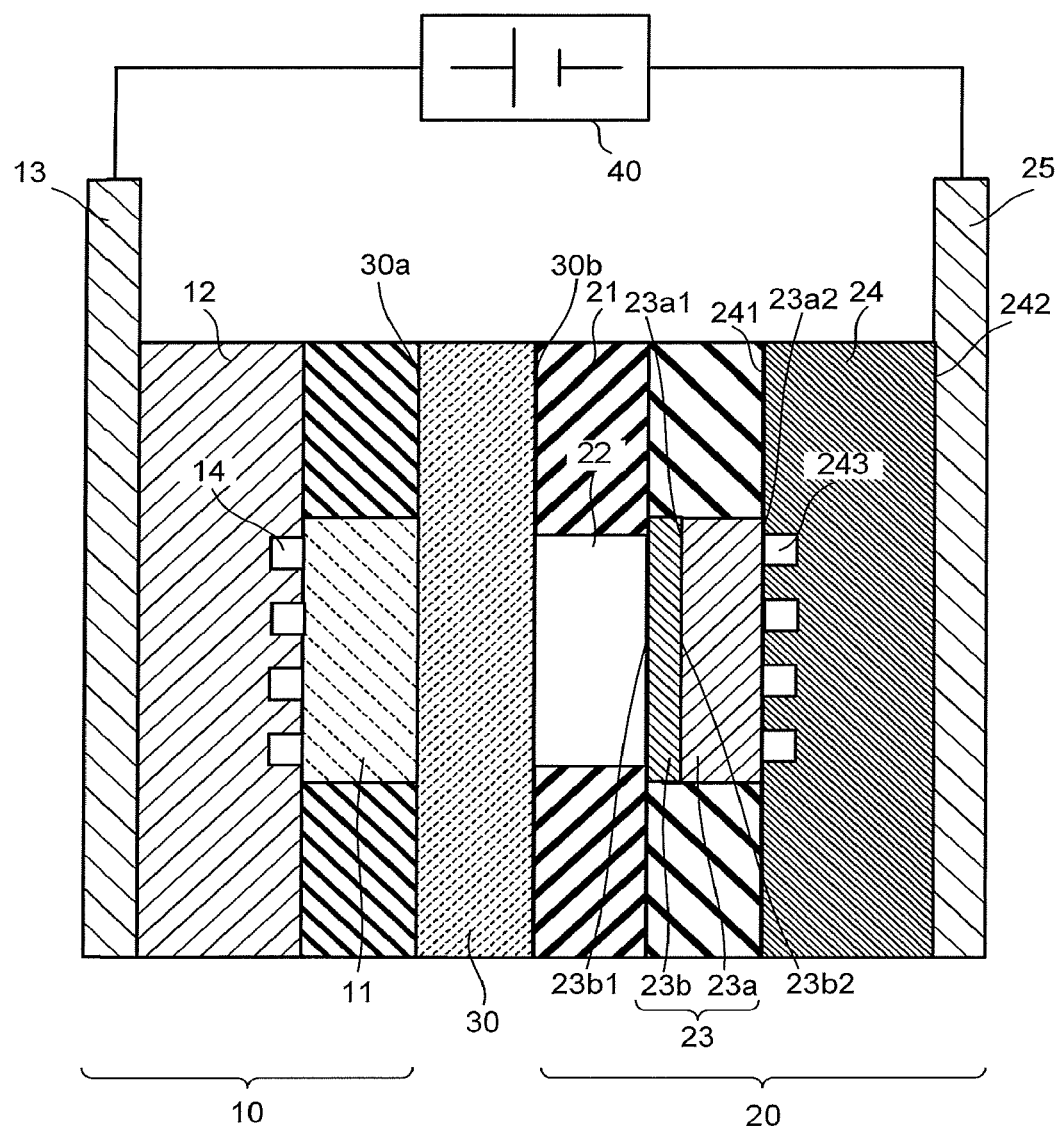
FIG. 1 is a schematic view illustrating a structure example of an electrochemical reaction device.
Figure 2:
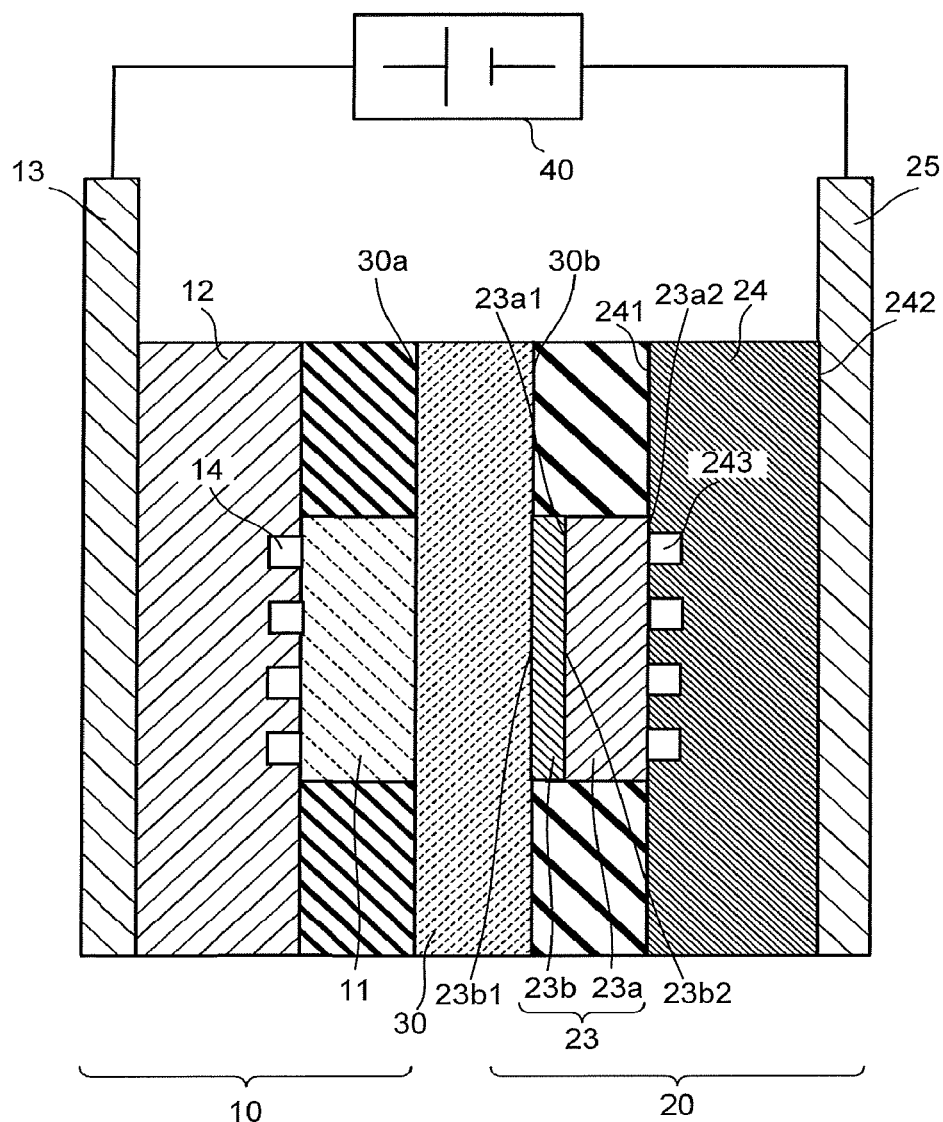
FIG. 2 is a schematic view illustrating another structure example of the electrochemical reaction device.

FIG. 1 and FIG. 2 are a schematic cross-sectional view illustrating a structure example of an electrochemical reaction device according to an embodiment. The electrochemical reaction device includes an anode part 10, a cathode part 20, a porous separator 30, and a power supply 40.

The anode part 10 can oxidize a first substance (a substance to be oxidized) to produce oxygen. For example, the anode part 10 can oxidize water ($H_2O$) to produce oxygen and hydrogen ions, or oxidize hydroxide ions ($OH^-$) to produce water and oxygen. The anode part 10 includes an anode 11, a flow path plate 12, a current collector 13, and a flow path 14.

The anode 11 is formed by supporting an oxidation catalyst on a substrate having a porous structure such as a mesh material, a punching material, a porous body, or a metal fiber sintered body, for example. The substrate may be formed of a metal such as titanium (Ti), nickel (Ni), or iron (Fe), or a metal material such as an alloy (for example, SUS) containing at least one of these metals. The anode 11 is supported by a support or the like, for example. The support has an opening, for example, and in the opening, the anode 11 is disposed.

As the oxidation catalyst, a material that lowers activation energy for oxidizing the first substance can be cited. In other words, a material that lowers an overvoltage when oxygen and hydrogen ions are produced through an oxidation reaction of the first substance can be cited. For example, iridium, iron, platinum, cobalt, manganese, and so on can be cited. Alternatively, a binary metal oxide, a ternary metal oxide, a quaternary metal oxide, or the like can be used as the oxidation catalyst. Examples of the binary metal oxide include manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O), and so on. Examples of the ternary metal oxide include Ni—Co—$O_2$, La—Co—O, Ni—La—O, Sr—Fe—O, and so on. Examples of the quaternary metal oxide include Pb—Ru—Ir—O, La—Sr—Co—O, and so on. The oxidation catalyst is not limited to the above, and as the oxidation catalyst, a metal complex such as a Ru complex or a Fe complex can also be used. Further, a plurality of materials may be mixed.

The flow path plate 12 has a groove facing the anode 11. The flow path plate 12 has a function as a flow path plate. As the flow path plate 12, a material having low chemical reactivity and high conductivity is preferably used. Examples of such a material include metal materials such as Ti and SUS, carbon, and so on.

The current collector 13 is electrically connected to the anode 11 via the flow path plate 12. The current collector 13 preferably contains a material having low chemical reactivity and high conductivity. Examples of such a material include metal materials such as Ti and SUS, carbon, and so on.

The flow path 14 contains a space between the anode 11 and the groove in the flow path plate 12. The flow path 14 has a function as an electrolytic solution flow path for allowing a first electrolytic solution as a liquid containing the first substance to flow therethrough.

The cathode part 20 can reduce a second substance (a substance to be reduced) to produce a reduction product. For example, the cathode part 20 may reduce carbon dioxide ($CO_2$) to produce a carbon compound or hydrogen. The cathode part 20 is not limited to this and may reduce nitrogen to produce ammonia. Further, hydrogen sulfide may be used as the second substance.

The cathode part 20 includes a flow path plate 21, a flow path 22, a cathode 23, a flow path plate 24 including a flow path 243, and a current collector 25. As illustrated in FIG. 2, the flow path plate 21 does not need to be provided. At this time, the cathode 23 may be in contact with the porous separator 30.

The flow path plate 21 has an opening having a function as the flow path 22. The flow path 22 is provided for allowing a second electrolytic solution as a liquid containing water and the second substance such as carbon dioxide to flow therethrough. The second electrolytic solution may contain the second substance. The flow path plate 21 preferably contains a material having low chemical reactivity and no conductivity. Examples of such a material include insulating resin materials such as an acrylic resin, polyetheretherketone (PEEK), and a fluorocarbon resin. Changing the amount of water contained in the electrolytic solution flowing through the flow path 22 and components of the electrolytic solution makes it possible to change oxidation-reduction reactivity and change selectivity of substances to be reduced and ratios of chemical substances to be produced.

At least one of the anode 11 and the cathode 23 may have a porous structure. Examples of the material applicable to an electrode layer having the porous structure include a carbon black such as ketjen black or VULCAN XC-72, activated carbon, metal fine powder, and so on, in addition to the above-described materials. The area of an activation surface that contributes to the oxidation-reduction reaction can be made large by having the porous structure, so that it is possible to increase conversion efficiency.

As a reduction catalyst, a material that lowers activation energy for reducing the second substance can be cited. In other words, a material that lowers an overvoltage when the reduction product is produced through a reduction reaction of the second substance can be cited. For example, a metal material or a carbon material can be used. As the metal material, for example, a metal such as platinum or nickel, or an alloy containing the metal can be used in the case of the reduction reaction of hydrogen. As the metal material, a metal such as gold, aluminum, copper, silver, platinum, palladium, or nickel, or an alloy containing the metal can be used in the case of the reduction reaction of carbon dioxide.

As the carbon material, graphene, carbon nanotube (CNT), fullerene, ketjen black, or the like can be used, for example. The reduction catalyst is not limited to the above, and as the reduction catalyst, for example, a metal complex such as a Ru complex or a Re complex, or an organic molecule having an imidazole skeleton or a pyridine skeleton may be used. Further, a plurality of materials may be mixed.

An example of the reduction product produced by the reduction reaction differs depending on the kind of the reduction catalyst. The reduction product is a carbon compound such as carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO), or ethylene glycol, or hydrogen, for example.

The porous structure preferably has a fine pore distribution of 5 nm or more and 100 nm or less. With the above-described fine pore distribution, an increase in catalyst activity is enabled. Furthermore, the porous structure preferably has a plurality of fine pore distribution peaks. This can achieve all of an increase in surface area, an improvement in dispersion of ions and reactant, and high conductivity at the same time. For example, the cathode 23 may be formed by stacking a reduction catalyst layer containing particles of a metal or an alloy applicable to the above-described reduction catalyst of 100 nm or less (a particulate reduction catalyst) on a conductive layer of the above-described material having a fine pore distribution of 5 μm or more and 10 μm or less. In this case, the particle may also have the porous structure, but does not always need to have the porous structure from the conductivity or the relationship between a reaction site and material diffusion. Further, the above-described particles may be supported by another material.

The cathode 23 has a porous conductive layer 23a having a function as a gas diffusion layer, for example, and a reduction catalyst layer 23b stacked on the porous conductive layer 23a and containing the reduction catalyst. The cathode 23 is supported by a support, or the like, for example. The support has an opening, for example, and in the opening, the cathode 23 is disposed.

The porous conductive layer 23a has a surface 23a1, a surface 23a2 facing the flow path plate 24, and a pore portion communicating from the surface 23a1 to the surface 23a2. Providing the porous conductive layer 23a between the flow path plate 24 and the reduction catalyst layer 23b (a gas phase side) makes it possible to facilitate gas-liquid separation. An average pore size of the pore portion is preferred to be 10 μm or less. Further, the porous conductive layer 23a has water repellency, thereby accelerating formation of the gas-liquid separation and discharges of water produced by the reaction and water migrating from the anode 11, and gas diffusibility is improved, which is preferred. A thickness of the porous conductive layer 23a is preferably 100 μm or more and 500 μm or less, and further preferably 100 μm or more and 300 μm or less. In the case of the thickness being less than 100 μm, uniformity on a cell surface deteriorates, in the case of the thickness being thick, a cell thickness and a member cost increase, and further, in the case of the thickness being more than 500 μm, reaction efficiency decreases due to an increase in the gas diffusibility. The porous conductive layer 23a is formed of a carbon paper, a carbon cloth, or the like, for example.

The reduction catalyst layer 23b has a surface 23b1 facing the flow path 22 and a surface 23b2 facing the surface 23a1 of the porous conductive layer 23a. The reduction catalyst layer 23b has, for example, a porous conductive layer (mesoporous layer) having a pore size smaller than that of the porous conductive layer 23a and the reduction catalyst supported on a surface of the mesoporous layer. Changing water repellency and porous body degree among the porous conductive layer 23a, the mesoporous layer, and the reduction catalyst makes it possible to accelerate gas diffusibility and discharge of liquid components. Further, an area of the porous conductive layer 23a may be made larger than an area of the reduction catalyst layer 23b. This makes it possible to supply gas to a cell uniformly and accelerate discharge of liquid components by combining with the structure of the flow path plate 24 and the porous conductive layer 23a.

As the porous conductive layer, a mixture of Nafion and conductive particles such as ketjen black may be used, and as the reduction catalyst, a gold catalyst may be used. Further, formation of projections and recesses of 5 µm or less on the surface of the reduction catalyst can increase the reaction efficiency. Further, the surface of the reduction catalyst is oxidized by application of a high frequency, and then subjected to electrochemical reduction, and thereby the cathode 23 having a nanoparticle structure can be formed. Other than gold, metal such as copper, palladium, silver, zinc, tin, bismuth, or lead is preferred. Besides, the porous conductive layer may further have a stacked structure composed of layers having different pore sizes. The stacked structure having the different pore sizes makes it possible to adjust the difference in reaction due to the difference in reaction product concentration near, for example, an electrode layer, the difference in pH, or the like, by the pore sizes to improve the efficiency.

When an electrode reaction with a low current density is performed by using relatively low light irradiation energy, there is a wide range of options in catalyst material. Accordingly, for example, it is easy to perform a reaction by using a ubiquitous metal or the like, and it is also relatively easy to obtain selectivity of the reaction. When the power supply 40 formed of a photoelectric conversion body is electrically connected to at least one of the anode 11 and the cathode 23 by a wire or the like, an electrode area generally becomes small for the reason of miniaturizing an electrolytic solution tank to achieve space saving, cost reduction, or the like, and the reaction is performed with a high current density in some cases. In this case, a noble metal is preferably used as the catalyst.

The electrochemical reaction device according to this embodiment is a simplified system, in which the anode 11 and the cathode 23 are integrated to reduce the number of parts. Accordingly, for example, manufacture, installation, and maintainability improve.

Figure 3:
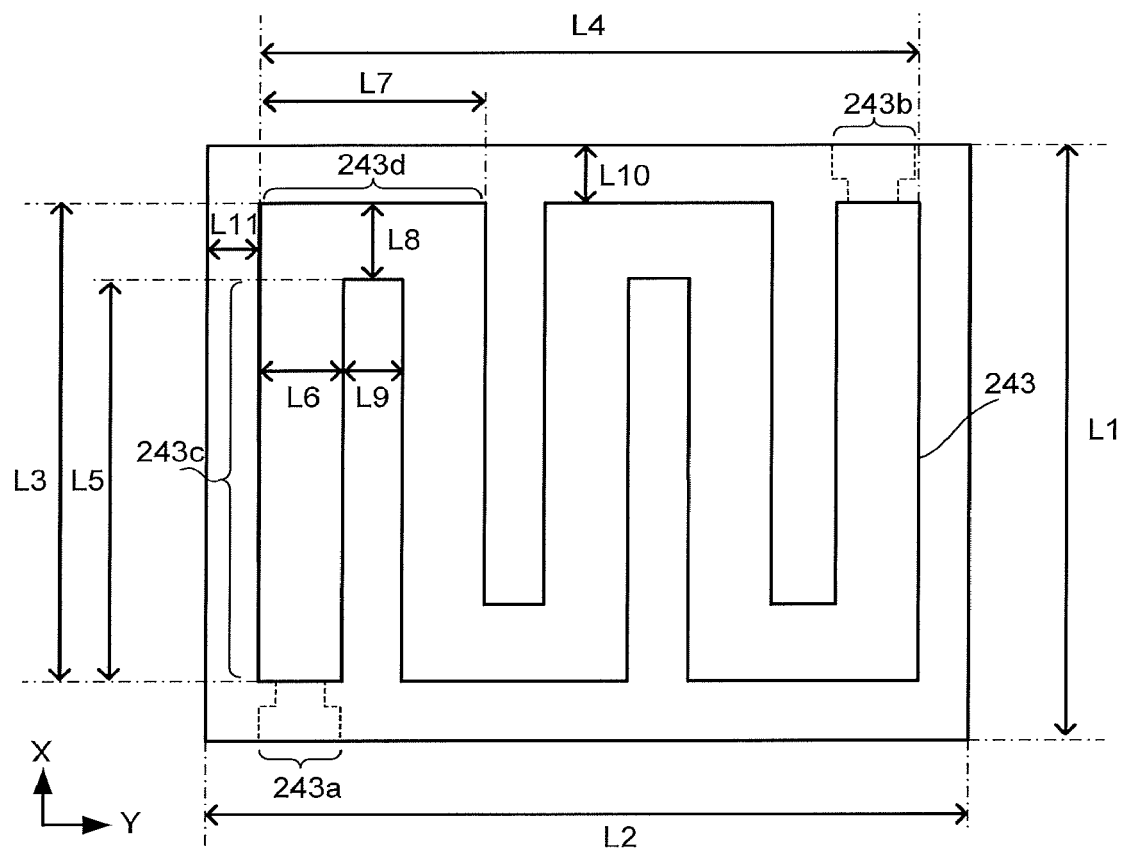
FIG. 3 is a schematic top view illustrating a structure example of a part of a flow path plate.
Figure 4:
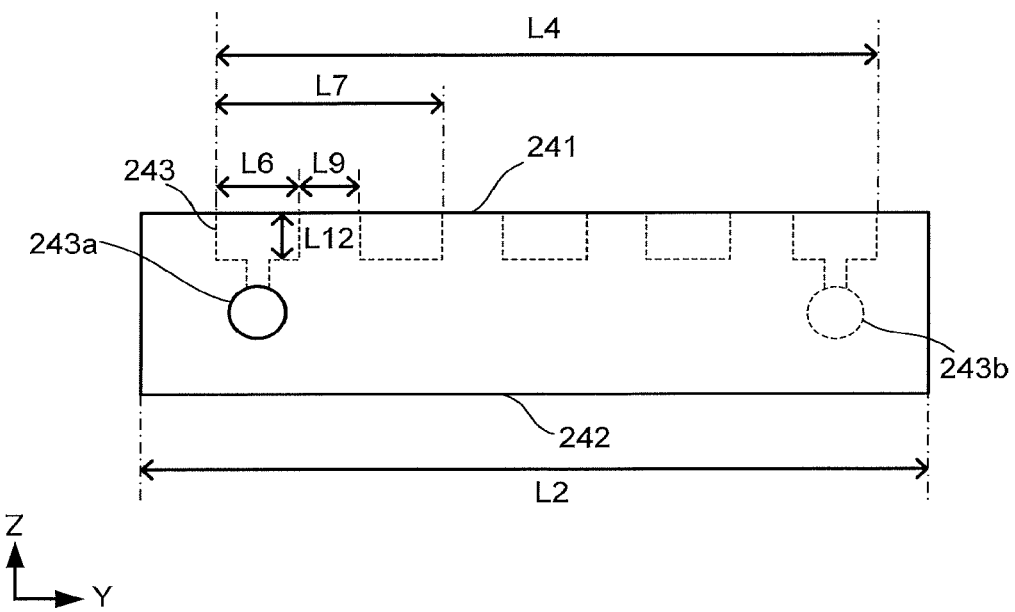
FIG. 4 is a schematic side view illustrating a structure example of a part of the flow path plate.

FIG. 3 is a schematic top view illustrating a structure example of a part of the flow path plate 24. FIG. 3 illustrates an X-Y plane of the flow path plate 24 including an X axis and a Y axis perpendicular to the X axis. FIG. 4 is a schematic side view illustrating a structure example of a part of the flow path plate 24. FIG. 4 illustrates a Y-Z plane of the flow path plate 24 including the Y axis and a Z axis perpendicular to the Y axis and the X axis. In FIG. 3 and FIG. 4, only an overlap of the flow path plate 24 and the surface 23b2 or the surface 23a2 is schematically illustrated.

The flow path plate 24 includes a surface 241, a surface 242, and the flow path 243. The surface 241 is in contact with the porous conductive layer 23a. The surface 242 faces the surface 241, and is in contact with the current collector 25. The flow path plate 24 illustrated in FIG. 3 and FIG. 4 has a rectangular parallelepiped shape, but is not limited to this.

The flow path 243 faces the surface 23a2 of the porous conductive layer 23a. The flow path 243 communicates with an inflow port 243a and an outflow port 243b. The inflow port 243a is provided in order to allow a gas containing the second substance to flow into the flow path 243 from the outside of the flow path plate 24 (outside of the cathode part 20). The outflow port 243b is provided in order to allow the gas to flow out to the outside of the flow path plate 24 (outside of the cathode part 20) from the flow path 243 and allow a product produced by the reduction reaction to flow out to the outside of the flow path plate 24.

The flow path 243 illustrated in FIG. 3 extends in a serpentine shape along the surface 241. The flow path 243 is not limited to this, and may extend in a comb-teeth shape or a spiral shape along the surface 241. The flow path 243 contains spaces formed by grooves and openings provided in the flow path plate 24, for example.

The flow path 243 has a plurality of regions 243c and a plurality of regions 243d. One of the regions 243c extends along an X-axis direction of the surface 241. One of the regions 243d extends so as to turn back from one of the regions 243c along the surface 241. Another of the regions 243d extends along the X-axis direction of the surface 241 from the region 243d.

A length in the X-axis direction of an overlap of the surface 241 and the surface 23a2 or the surface 23b2 is defined as L1. A length in a Y-axis direction of the overlap of the surface 241 and the surface 23a2 or the surface 23b2 is defined as L2. A length in the X-axis direction of an overlap of the surface 23a2 or the surface 23b2 and the flow path 243 is defined as L3. A length in the Y-axis direction of the overlap of the surface 23a2 or the surface 23b2 and the flow path 243 is defined as L4. A length of the region 243c is defined as L5. An average width of the region 243c is defined as L6. A length of the region 243d is defined as L7. An average width of the region 243d is defined as L8. An average width between one of the regions 243c and another of the regions 243c is defined as L9. The shortest distance between an end portion in the X-axis direction of the overlap of the surface 241 and the surface 23a2 or the surface 23b2 and the flow path 243 is defined as L10. The shortest distance between an end portion in the Y-axis direction of the overlap of the surface 241 and the surface 23a2 or the surface 23b2 and the flow path 243 is defined as L11. A depth in a Z-axis direction of the flow path 243 is defined as L12.

As the amount of gas changes due to the reaction between the vicinity of the inflow port 243a and the vicinity of the outflow port 243b, a flow speed changes in some cases. In contrast to this, for example, the width of the flow path 243 is gradually tapered toward the outflow port 243b, or the number of branches of the flow path 243 in parallel connection is changed, thereby making it possible to increase uniformity of the entire reduction reaction of the cathode 23. When a value obtained by dividing an integrated value of the width of the flow path 243 with respect to the entire length of the flow path 243 by the above-described entire length is used as a mean value and a value obtained by dividing an integrated value of, with respect to the entire length of a region between one of the regions 243c and another of the regions 243c (also referred to as a land), a width of the above-described region by the above-described entire length is used as a mean value, the width of the above-described region is preferably smaller than the width of the flow path 243. This enables efficient supply of the gas to the porous conductive layer 23a. However, when the above-described width is small extremely, the gas or the like becomes likely to be supplied through the above-described region rather than the flow path 243.

Although the flow path 243 can be formed variously, the gas is supplied in an overlap of the flow path 243 and the porous conductive layer 23a. By changing the flow rate of the gas and the flow path width, the flow speed is changed to adjust pressure or the like, resulting in an increase in partial pressure of the gas. Further, discharges of the produced water and the water that has migrated from the oxidation side are also accelerated by circulation of the gas. In the meantime, the mobility of the produced water and the water that has migrated from the oxidation side between the regions 243c is inferior to that in the region facing the flow path 243, and moisture amounts in the porous conductive layer 23a and of the reduction catalyst layer 23b are higher. From this viewpoint, when the area between the regions 243c is large, hydrogen generation is large and reduction performance of the gas decreases. Further, when the width between the regions 243c is wide, discharge of water to the flow path 243 from a center portion between the regions 243c and a supply amount of the gas to between the regions 243c from the flow path 243 decrease. Therefore, the hydrogen generation increases and cell performance decreases. Further, there are no adjacent flow paths in a region outside a region, of the reduction catalyst layer 23b and the porous conductive layer 23a, surrounding the outer periphery of the flow path 243, and therefore, when the width of the periphery between the regions 243c is large, an increase in production rate of the hydrogen results in a significant impact.

It is impossible to say that the region between one of the regions 243c and another of the regions 243c only needs to be narrow, and there is sometimes a case that the difference in pressure loss between the porous conductive layer 23a and the flow path 243 prevents the gas from flowing through the flow path 243 to make the gas flow through the above-described region easily. In this case, the surface uniformity of the reaction is impaired and the reaction efficiency of the electrochemical reaction device decreases. Furthermore, due to the small area of the above-described region, a contact area between the porous conductive layer 23a and the flow path plate 24 decreases, resulting in that a contact resistance increases and the reaction efficiency of the electrochemical reaction device decreases.

The area of the surface 23a2 is made larger than the area of the surface 23b2, thereby making it possible to facilitate uniform adjustment of the amounts of the gas and the moisture to the porous conductive layer 23a, so that it is possible to improve the reaction efficiency. However, when the area of the surface 23a2 is much larger than the area of the surface 23b2, the cell area becomes large, resulting in a decrease in the efficiency due to effects of cost, productivity, heat release, and the like.

With respect to points of the overlap of the surface 23a2 or the surface 23b2 and the surface 241, a distance as far as possible to the overlap of the surface 23a2 or the surface 23b2 and the flow path 243 causes the reduction reaction to predominantly produce hydrogen more than a carbon compound. Further, when a portion far from the overlap of the surface 23a2 or the surface 23b2 and the flow path 243 in the overlap of the surface 23a2 or the surface 23b2 and the surface 241 is large, the reduction performance of the gas decreases. Therefore, making a standard deviation of the shortest distance from the points of the overlap of the surface 23a2 or the surface 23b2 and the surface 241 to the overlap of the surface 23a2 or the surface 23b2 and the flow path 243 small makes it possible to improve the reduction performance of the gas.

The depth of the flow path 243 in the Z-axis direction is preferably shallow from the viewpoints of supplying the gas to the porous conductive layer 23a, discharging the liquid, and performing the reaction uniformly on the cell surface. However, the flow path being narrow increases the pressure loss of the flow path, thereby causing an energy loss of the gas supply and flowing through not the flow path but the gas diffusion layer, and thereby the uniform reaction on the cell surface is prevented, and thus, an extremely narrow flow path is not preferred.

In general, the flow path 243 has the average width (L6) of about 0.5 to 1.5 mm of the region 243c and a depth of about 0.5 to 1.5 mm in the Z-axis direction, and a ratio of the average width (L6) of the region 243c of the flow path 243 to the average width (L9) between one of the regions 243c and another of the regions 243c is about 0.4 to 0.6.

As the first electrolytic solution and the second electrolytic solution, an aqueous solution containing, for example, $LiHCO_3$, $NaHCO_3$, $KHCO_3$, $CsHCO_3$, phosphoric acid, boric acid, or the like may be used. Further, as the first electrolytic solution and the second electrolytic solution, an aqueous solution containing, for example, an optional electrolyte can be used. Examples of the aqueous solution containing the electrolyte include aqueous solutions containing phosphoric acid ions ($PO_4^{2-}$), boric acid ions ($BO_3^{3-}$), sodium ions ($NO^+$), potassium ions ($K^+$), calcium ions ($Ca^{2+}$), lithium ions ($Li^+$), cesium ions ($Cs^+$), magnesium ions ($Mg^{2+}$), chloride ions ($Cl^-$), hydrogen carbonate ions ($HCO_3^-$), carbonate ions ($CO_3^-$), or the like. The first electrolytic solution and the second electrolytic solution may contain substances different from each other.

As the above-described electrolytic solutions, for example, an ionic liquid that is made of a salt of cations such as imidazolium ions or pyridinium ions and anions such as $BF_4^-$ or $PF_6^-$ and that is in a liquid state in a wide temperature range, or an aqueous solution thereof can be used. Other examples of the electrolytic solution include amine solutions of ethanolamine, imidazole, pyridine, and so on, or aqueous solutions thereof. Examples of the amine include primary amine, secondary amine, tertiary amine, and so on. These electrolytic solutions may have high ion conductivity, have a property of absorbing the second substance, and have characteristics of decreasing reduction energy.

Examples of the primary amine include methylamine, ethylamine, propylamine, butylamine, pentylamine, hexylamine, and so on. A hydrocarbon of the amine may be substituted by alcohol or halogen. Examples of the amine whose hydrocarbon is substituted include methanolamine, ethanolamine, chloromethyl amine, and so on. Further, an unsaturated bond may exist. The same applies to hydrocarbons of the secondary amine and the tertiary amine.

Examples of the secondary amine include dimethylamine, diethylamine, dipropylamine, dibutylamine, dipentylamine, dihexylamine, dimethanolamine, diethanolamine, dipropanolamine, and so on. The substituted hydrocarbons may be different. The same applies to the tertiary amine. Examples of amine in which hydrocarbons are different include methylethylamine, methylpropylamine, and so on.

Examples of the tertiary amine include trimethylamine, triethylamine, tripropylamine, tributylamine, trihexylamine, trimethanolamine, triethanolamine, tripropanolamine, tributanolamine, triexanolamine, methyl diethylamine, methyldipropylamine, and so on.

Examples of the cations of the ionic liquid include 1-ethyl-3-methylimidazolium ions, 1-methyl-3-propylimidazolium ions, 1-butyl-3-methylimidazole ions, 1-methyl-3-pentylimidazolium ions, 1-hexyl-3-methylimidazolium ions, and so on.

A second place of the imidazolium ion may be substituted. Examples of the cation having the imidazolium ion in which the second place is substituted include 1-ethyl-2,3-dimethylimidazolium ions, 1-2-dimethyl-3-propylimidazolium ions, 1-butyl-2,3-dimethylimidazolium ions, 1,2-dimethyl-3-pentylimidazolium ions, 1-hexyl-2,3-dimethylimidazolium ions, and so on.

Examples of the pyridinium ion include methylpyridinium, ethylpyridinium, propylpyridinium, butylpyridinium, pentylpyridinium, hexylpyridinium, and so on. In both of the imidazolium ion and the pyridinium ion, an alkyl group may be substituted, or an unsaturated bond may exist.

Examples of the anion include fluoride ions, chloride ions, bromide ions, iodide ions, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(perfluoroethylsulfonyl)imide, and so on. A dipolar ion in which the cation and the anion of the ionic liquid are coupled by hydrocarbons may be used. A buffer solution such as a potassium phosphate solution may be supplied to the flow paths.

The flow path plate 24 is preferred to be a metal plate containing a material having low chemical reactivity and high conductivity. As such a material, metal plates of Ti, SUS, and so on can be cited.

The current collector 25 is in contact with the surface 242 of the flow path plate 24. The current collector 25 preferably contains a material having low chemical reactivity and high conductivity. As such a material, metal materials such as Ti and SUS, carbon, and so on can be cited.

The porous separator 30 is provided between the anode 11 and the cathode 23. The porous separator 30 has a face 30a facing the anode part 10 and a face 30b facing the cathode part 20. The porous separator 30 has fine pores.

As an example of a conventional electrochemical reaction device, an example in which it has an ion exchange membrane between an anode and a cathode can be cited. The ion exchange membrane allows the anode and the cathode to separate from each other while allowing a part of ions to migrate between the anode and the cathode. However, because the ion exchange membrane is expensive, manufacturing costs of the electrochemical reaction device are increased. Further, as for the ion exchange membrane, ion conductivity is decreased by impurity metal ions or the like in an electrolytic solution. Furthermore, as for the ion exchange membrane, a life is decreased by electrolytic solution components or the like. The decrease in the ion conductivity and the decrease in the life of the ion exchange membrane causes a decrease in reaction efficiency of the electrochemical reaction device. In addition to this, the kind of the ion exchange membrane is to be selected depending on pH of or existing ions in the electrolytic solution while considering compatibility with a catalyst and the electrolytic solution. Accordingly, development of an ion exchange membrane suitable for each of an oxidation catalyst, a reduction catalyst, and an electrolyte is ideal, but under the present situation, selection flexibility of the ion exchange membrane is low.

As another example of a conventional electrochemical reaction device, an example in which an ion exchange membrane is not provided and an interval between an anode and a cathode in an electrolytic solution is made larger than that in a case of providing the ion exchange membrane or an example in which a porous partition wall is further provided between an anode and a cathode can be cited. However, the interval between the anode and the cathode is large and solution resistance is large, so that the reaction efficiency is low. Further, both an electrolyte on an anode side and an electrolyte on a cathode side are required to be liquid, and it is impossible to perform the oxidation reaction by using liquid on the anode side and perform the reduction reaction by using gas on the cathode side as performed in the electrochemical reaction device according to the embodiment.

In the electrochemical reaction device according to the embodiment, providing the porous separator between the anode and the cathode instead of the ion exchange membrane achieves at least one of suppression of the increase in the manufacturing costs of the electrochemical reaction device, suppression of the decrease in the reaction efficiency of the electrochemical reaction device owing to suppression of the decrease in the ion conductivity and suppression of the decrease in the life due to the electrolytic solution components or the like, and improvement in the selection flexibility of a membrane material.

The porous separator 30 has moderate insulation performance. When the porous separator 30 has high conductivity, a current corresponding to direct current resistance of the porous separator 30 in a current generated through application of voltage to between the anode 11 and the cathode 23 is lost. Accordingly, energy to be used for the electrochemical reaction is lost. Sheet resistance of the porous separator 30 is preferably 100 m$\Omega$/cm$^2$ or more.

When the porous separator 30 is provided, an interval between the anode 11 and the cathode 23 is nearly equal to or smaller than that in a case of providing the ion exchange membrane. In the electrochemical reaction device according to the embodiment, the electrochemical reaction is performed by using liquid in the anode part 10 and by using gas in the cathode part 20. The electrochemical reaction device according to the embodiment allows liquid components in the anode part 10 and gas components in the cathode part 20 to separate from each other without circulating by convection, and is to separate a product and each of the components as much as possible. Therefore, the electrochemical reaction device according to the embodiment is required to achieve the gas-liquid separation. When the gas-liquid separation cannot be achieved, a reduction product moves to the anode part 10 and is subjected to reoxidation, for example, thereby decreasing efficiency of the reaction. Further, when the liquid components in the anode part 10 move to the cathode part 20, there emerge problems of a decrease in diffusibility of the gas in the cathode 23, a decrease in reaction selectivity, mixing of the liquid components into the flow path 243, and the like. Furthermore, because components of the product and source materials mix at both the electrodes and are not capable of separating from each other, separation in a post-process is necessary.

The porous separator 30 has a hydrophilic property. This allows the liquid components to permeate the fine pores and makes it possible to facilitate the gas-liquid separation. Accordingly, the porous separator 30 allows specific ions to pass therethrough by using electrolytic solution components, for example, water as an intermediary. Further, the electrolytes suitable for the reduction catalyst and the oxidation catalyst can each be used.

For example, as long as the electrolytic solution is an aqueous solution, water enters into the fine pores of the porous separator 30 to allow hydrogen ions to migrate. This makes it possible to have a function similar to that of the ion exchange membrane and increase migration efficiency of ions. However, in a case of a thin membrane, when gas moves between the anode 11 and the cathode 23, a circular reaction due to the reoxidation of the reduction product easily occurs. Therefore, the movement of the gas between the anode 11 and the cathode 23 through the porous separator 30 is preferred to be small.

The porous separator 30 is produced by mixing, for example, polytetrafluoroethylene (PTFE) and porous components and drawing and molding the mixture. A fine pore size and a fine pore shape are controlled by a drawing condition of one axis, two axes, or the like and the porous components. Because PTFE has water repellency, a surface modification may be performed and hydrophilic treatment may be performed. The PTFE subjected to the hydrophilic treatment is also referred to as hydrophilic PTFE. PTFE has been explained as an example, but this is not restrictive. PTFE is excellent in chemical resistance and chemical stability, and has excellent performance such as heat resistance.

The porous separator 30 is not limited to this, and includes examples of a membrane having a basic structure of hydrocarbon, a vinylidene fluoride, a porous acrylic body, and porous bodies of ceramic, zirconia, cellulose, paper, polyolefin, polyurethane, polyethylene, polypropylene, and so on. Further, as the porous separator 30, POREFLON® manufactured by Sumitomo Electric Industries, Ltd., a membrane filter of ADVANTEC Co., Ltd., a fluorocarbon resin membrane having tetrafluoroethylene subjected to the hydrophilic treatment, and so on can be cited.

As the porous separator 30, a membrane having an ion exchange resin covering the above-described porous bodies may be used. Covering the porous bodies with the ion exchange resin makes it possible to adjust the hydrophilic property, a hydrophobic property, and the fine pore size of the porous separator 30, permeation resistance of ions in fine pores, the conductivity, and the like and improve the performance of the porous separator 30. Further, it is also possible to improve ion permeability while making the fine pore size small.

Nafion is a perfluorocarbon material, and is a copolymer of tetrafluoroethylene and perfluoro[2-(fluorosulfonylethoxy)propylvinyl ether]. In Nafion, a value representing an amount of ion-exchange groups in the number of grams per 1 mol of sulfonic acid group is referred to as an equivalent weight (EW). Further, an ion-exchange capacity (IEC) is a value satisfying IEC=100/EW. In general, a high cost is spent on a material having a small EW or a large IEC, and the material has problems of a life, strength, and the like.

Forming the porous separator 30 of a material having a small IEC and not used as a conventional ion exchange membrane much makes it possible to reduce costs, increase the strength, enhance durability, and make the life long. Further, it becomes possible to use a catalyst under a high-performance condition depending on compatibility with the catalyst and electrolytic solution components.

In a case of Nafion, the number of molecules (number of $CF_2CF_2$) m of an average chain of tetrafluoroethylene is a number satisfying EW=100 m+446. In a case of normal Nafion, m is 10000 to 100000. With respect to molecules of a sulfonic acid having a cation exchange property and amine, imidazole, and the like having an anion exchange property, which have difficulty in being used for the electrochemical reaction device as the conventional ion exchange membrane, by forming the porous separator 30 of molecules, such as tetrafluoroethylene, in which a length of a molecule having no ion exchange property exceeds 1000000 or a material in which EW exceeds one hundred million with respect to weight of a membrane, the performance can be improved at a low cost. Further, by using a porous separator formed by modifying a slight amount of sulfonic acid groups on a surface of the porous separator using a material through which ions hardly pass or a hydrophilic porous separator having modifying groups through which ions do not easily pass (hydroxyl groups or the like) as the porous separator 30, an ion exchange is mainly performed by electrolyte components in fine pores, so that it is possible to achieve high performance and a low cost.

The power supply 40 is electrically connected to the anode 11 and the cathode 23. With use of the electric energy supplied from the power supply 40, the reduction reaction by the cathode 23 and the oxidation reaction by the anode 11 are performed. For example, a wire may connect the power supply 40 and the anode 11 and connect the power supply 40 and the cathode 23. The power supply 40 includes a photoelectric conversion element, a system power supply, a power supply device such as a storage battery, or a conversion unit that converts renewable energy such as wind power, water power, geothermal power, or tidal power into electric energy. For example, the photoelectric conversion element has a function of separating charges using energy of irradiating light such as sunlight. Examples of the photoelectric conversion element include a pin-junction solar cell, a pn-junction solar cell, an amorphous silicon solar cell, a multijunction solar cell, a single crystal silicon solar cell, a polycrystalline silicon solar cell, a dye-sensitized solar cell, an organic thin-film solar cell, and so on.

Next, there will be explained an operation example of the electrochemical reaction device according to the embodiment. Here, the case where the gas containing carbon dioxide is supplied through the flow path 243 to produce carbon monoxide is explained as one example. In the anode part 10, as expressed by the following formula (1), the water undergoes an oxidation reaction and loses electrons, and oxygen and hydrogen ions are produced. At least one of the produced hydrogen ions migrates to the cathode part 20 through the porous separator 30.

$$2H_2O \rightarrow 4H^+ + O_2 + 4e^- \tag{1}$$

In the cathode part 20, as expressed by the following formula (2), the carbon dioxide undergoes a reduction reaction, and the hydrogen ions react with the carbon dioxide while receiving the electrons, and carbon monoxide and water are produced. Further, as expressed by the following formula (3), the hydrogen ions receive the electrons, and hydrogen is thereby produced. At this time, the hydrogen may be produced simultaneously with the carbon monoxide.

$$CO_2 + 2H^+ + 2e^- \rightarrow CO + H_2O \tag{2}$$

$$2H^+ + 2e^- \rightarrow H_2 \tag{3}$$

The power supply 40 needs to have an open-circuit voltage equal to or more than a potential difference between a standard oxidation-reduction potential of the oxidation reaction and a standard oxidation-reduction potential of the reduction reaction. For example, the standard oxidation-reduction potential of the oxidation reaction in the formula (1) is 1.23 [V]. The standard oxidation-reduction potential of the reduction reaction in the formula (2) is 0.03 [V]. The standard oxidation-reduction potential of the reduction reaction in the formula (3) is 0 [V]. At this time, the open-circuit voltage needs to be 1.26 [V] or more in the reactions of the formula (1) and the formula (2).

As for the porous separator 30 between the anode and the cathode, the carbon dioxide gas, carbonate ions, hydrogen carbonate ions, and so on sometimes impair the porous separator 30. Adjustment of the amount of carbon dioxide gas and the amount of vapor at this time enables extension of the life. However, under a condition of the hydrogen ions being present abundantly, generation of hydrogen occurs, and therefore even with too many ions, applied energy is not used for the reduction reaction of the carbon dioxide, resulting in a decrease in reduction efficiency of the carbon dioxide. Therefore, it is necessary to maintain a balance between the amount of hydrogen ions required for the reduction of the carbon dioxide and suppression of the hydrogen generation.

The reduction reactions of hydrogen ions and carbon dioxide are reactions consuming hydrogen ions. This means that a small amount of the hydrogen ions results in low efficiency of the reduction reaction. Therefore, the first electrolytic solution and the second electrolytic solution preferably have different hydrogen ion concentrations so that the concentration difference facilitates the migration of the hydrogen ions. The concentration of anions (for example, hydroxide ions) may be made different between the electrolytic solution on the anode side and the electrolytic solution on the cathode side. Further, in order to increase the concentration difference of the hydrogen ions, a method is considered, in which an inert gas not containing carbon dioxide (nitrogen, argon, or the like) is directly blown into the electrolytic solution, for example, to let the carbon dioxide contained in the electrolytic solution go, to thereby reduce the concentration of the hydrogen ions in the electrolytic solution.

The reaction efficiency of the formula (2) varies depending on the concentration of the carbon dioxide dissolved in the electrolytic solution. The higher the concentration of the carbon dioxide, the higher the reaction efficiency, and as the former is lower, the latter is lower. The reaction efficiency of the formula (2) also varies depending on the concentration of the carbon dioxide and the vapor amount. As for these reactions, the porous conductive layer 23a is provided between the reduction catalyst layer 23b and the flow path 243 and the carbon dioxide is supplied through the porous conductive layer 23a, thereby making it possible to increase the concentration of the carbon dioxide in the electrolytic solution. Although the carbon dioxide is introduced into the flow path 243 in a gaseous form and the carbon dioxide is supplied to the reduction catalyst, by the water migrating from the anode 11 and the water produced by the reaction, the concentrations of the carbon dioxide and the water in the reduction catalyst layer 23b vary.

Unless a liquid component produced when reducing the carbon dioxide is efficiently discharged to the outside of the cathode part 20, the porous conductive layer 23a and the reduction catalyst layer 23b are sometimes clogged with the liquid component to decrease the reaction efficiency. For example, when such an electrode material as a perforated metal or an expanded metal, which is often used for the cathode 23, is used to form a type of obtaining both performances of gas and current collection, a decrease in the reaction efficiency is caused. Thus, the electrochemical reaction device according to this embodiment has a composition in which a flow path plate having a narrow tubular flow path is used and the generated liquid component is forced out by the flow path to be discharged. The flow path is formed by a plurality of flow paths disposed in parallel, a serpentine shaped flow path, or a combination thereof. Further, a distribution of the flow path with respect to a reaction surface is preferred to be uniform so that a uniform reaction can be performed on the cell surface.

The reduction catalyst for reducing the carbon dioxide varies in selectivity depending on the electrolyte, electrolyte membrane, or vapor pressure that is in contact therewith, and reduces the carbon dioxide to produce carbon monoxide, formic acid, ethylene, methane, and the like, but reduces protons depending on a condition to produce a large amount of hydrogen, therefore resulting in a decrease in reduction efficiency of the carbon dioxide. This is because a proton source used for the reduction of the carbon dioxide is hydrogen ions or hydrogen carbonate ions, and the selectivity changes depending on, for example, the concentration of the hydrogen carbonate ions in the electrolytic solution or the pH. This change greatly affects the selectivity of carbon monoxide and hydrogen in a catalyst mainly using gold, and in a catalyst to perform a multielectron reduction of copper and the like, selectivities of carbon monoxide, formic acid, ethylene, methane, methanol, ethanol, formaldehyde, acetone, and so on are different from one another. Selecting the electrolytic solution becomes important for performing these controls. However, when the catalyst layer is in contact with the electrolyte membrane (or the electrolytic solution on the oxidation side) in order to reduce a cell resistance in the system of supplying the carbon dioxide gas to the reduction catalyst, the electrolytic solution is determined by compatibility with the oxidation catalyst, a cell resistance, or a balance of a composition of the electrolyte membrane, or the like with members forming the cell, so that it is difficult to select an optional electrolytic solution.

However, when the catalyst layer is in contact with the electrolyte membrane (or the electrolytic solution on the anode side) in order to reduce a cell resistance in the system of supplying the carbon dioxide gas to the reduction catalyst, the electrolytic solution is determined by compatibility with the oxidation catalyst, a cell resistance, or a balance of a composition of the electrolyte membrane, or the like with members forming the cell, so that it is difficult to select an optional electrolytic solution. Thus, changing the structure of the porous separator 30 also makes it possible to adjust the concentrations of the carbon dioxide and the water in the catalyst layer.

The production is not focused only on the reduction of carbon dioxide, and a reduced substance of carbon dioxide and hydrogen can also be produced at an arbitrary ratio in such a manner that, for example, carbon monoxide and hydrogen are produced at a ratio of 1:2, and through a chemical reaction performed thereafter, methanol is manufactured. The hydrogen is relatively easily obtainable by electrolyzing water, or is a fossil fuel-derived inexpensive raw material that is easily obtainable, so that the ratio of the hydrogen does not need to be large. Further, using the carbon dioxide as a raw material also contributes to a warming reduction effect, and thus when only the carbon monoxide can be reduced, environmental properties improve, but it is still difficult to efficiently cause a reaction. From the viewpoints of reaction efficiency, achievability, and a rate of the electrolyzing, a ratio of the carbon monoxide to the hydrogen is at least 1 or more and desirably 1.2 or more, and the ratio of 1.5 or more is preferred from the viewpoints of economic efficiency, environmental properties, and achievability.

Next, a pressure loss of the porous separator 30 will be explained. A pressure gradient ∇P (kPa/m) of the porous separator 30 is represented by the following formula.

$$\nabla P = -\mu/K \times Q$$

(in the formula, A represents a cross-sectional area (m²) of the porous separator 30, Q represents a volume flow rate (m³/s) of a liquid (electrolytic solution) passing through the porous separator 30, μ represents a coefficient of viscosity (μPa·s) of the liquid (electrolytic solution) passing through the porous separator 30, and K represents a coefficient of permeability of the porous separator 30)

Further, the above-described K is represented by the following formula.

$$K = d_m^2 \times \varepsilon^3 / 180 \times (1-\varepsilon)^2$$ (in the formula, $d_m$ represents an average fine pore size (m) of the porous separator 30 and ε represents a porosity of the porous separator 30)

The porosity of the porous separator 30 is preferred to be high. However, when the porosity is too high, the gas-liquid separation becomes difficult. The porosity of the porous separator 30 is preferably 0.5 (50%) or more, and for the gas-liquid separation and structural stability, it is further preferably 0.6 (60%) or more, and with the gas-liquid separation and the structural stability, it is preferably 0.95 (95%) or less. The porosity is more preferably about 0.8 to 0.9 (80 to 90%) from the viewpoint of the structural stability.

The porous separator 30 is permeated by ions and has low permeation resistance of ions. The coefficient of permeability K of the porous separator 30 is preferably $1.7 \times 10^{-20}$ m² or more and $1.7 \times 10^{-16}$ m² or less.

For example, when carbon dioxide is reduced to produce carbon monoxide at a current density of 200 mA/cm² in a catalyst area of 7 cm squire (4900 mm²), water is required to pass through the porous separator 30 at a volume flow rate of 0.05 cc/min. Thus, water is assumed to pass through the porous separator 30 at a volume flow rate of 0.1 cc/min twice as high as the required volume flow rate. An area of the flow path 243 (L3×L4) is assumed to be 50% of the catalyst area, and an area of a portion through which water passes in the porous separator 30 is assumed to be 25 cm². An area flow rate (a liquid flow rate per a cross-sectional area of the porous separator 30) is assumed to be 0.004 cc/min/cm². A coefficient of viscosity of an electrolytic solution is assumed to be 0.005 μPa·s. This is a degree of a diluting solution of KOH, for example.

Figure 5:
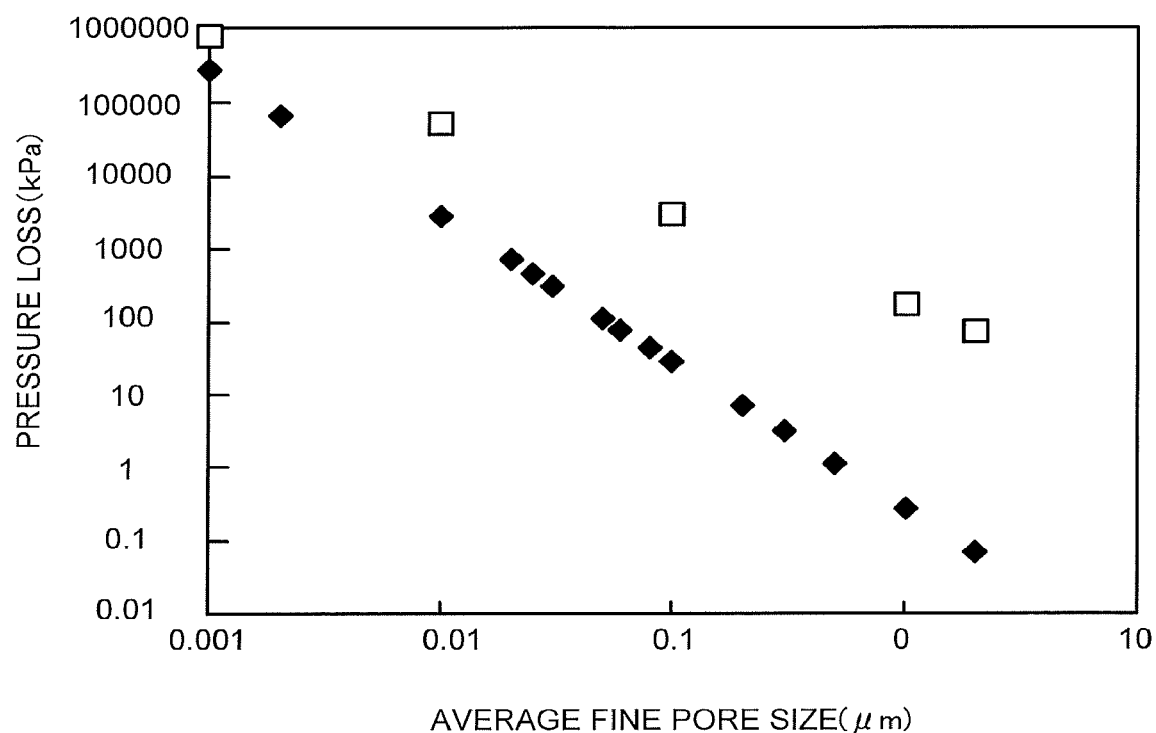
FIG. 5 is a chart illustrating a relationship between an average fine pore size and a pressure loss of a porous separator.

The pressure loss of the porous separator 30 is calculated by a product of the pressure gradient ∇P of the porous separator 30 and a thickness (m) of the porous separator 30. FIG. 5 is a chart illustrating a relationship between an average fine pore size and the pressure loss of the porous separator 30 under the above-described conditions. The relationship between the average fine pore size and the pressure loss of the porous separator 30 when the thickness of the porous separator 30 is assumed to be typical 30 μm and the porosity thereof is assumed to be 0.5 is indicated by diamond-shaped marks in FIG. 5. For example, the pressure loss when the average fine pore size is 0.1 μm is 14.4 kPa. Accordingly, adjusting a pressure to be exerted on the face 30a and the face 30b in consideration of the pressure loss of about 14.4 kPa makes the electrochemical reaction progress. Too much exerted pressure makes permeating liquid components increase, which is not preferred. It is preferable to maintain a pressure difference between the face 30a and the face 30b and operate the electrochemical reaction device.

When the porous separator 30 has water repellency, a value of K (coefficient of permeability) becomes small. The relationship between the average fine pore size and the pressure loss of the porous separator 30 when the porous separator 30 is assumed to have the water repellency, the thickness of the porous separator 30 is assumed to be 30 μm, and the porosity thereof is assumed to be 0.5 is indicated by square marks in FIG. 5. It is found from this that the porous separator 30 has the water repellency to thereby increase the pressure loss. Tentatively, gas-liquid separation performance is considered to be improved by imparting the water repellency to the porous separator 30. However, having the water repellency extremely makes the permeability of ions deteriorate, and therefore it is necessary to make the porous separator 30 thin.

Here, a pressure loss of a flow path when gas flows therethrough is estimated roughly. Four flow paths each having the same structure as that in FIG. 3 are provided so as to stand side by side as one example of the flow path, and L6 is assumed to be 0.8 mm, L9 is assumed to be 0.8 mm, L12 is assumed to be 1 mm, a catalyst area is assumed to be 7 cm square (4900 mm²), and an area of the flow path 14 (L3×L4) is assumed to be 50% of the catalyst area. The respective four flow paths meander so as to make nine turnbacks. For example, a 200 ccm carbon dioxide gas is made to flow through the above-described flow paths to produce a pressure loss of 2 to 3 kPa.

Further, a pressure loss of a flow path when liquid flows therethrough is estimated roughly. For example, 30 ccm water is made to flow through flow paths similar to the above-described ones to produce a pressure loss of about 1 kPa. A pressure difference between both the cases is 2 to 3 kPa even though it is overestimated, and the liquid components are prevented from moving to the cathode 23 extremely and the gas components in the cathode 23 are also prevented from moving to the anode 11 to enable an operation. Particularly when a pressure on the anode part 10 side is adjusted and the amount of a liquid permeating the porous separator 30 is adjusted, a variation of 2 to 3 kPa has no problem. However, an application of voltage to both the electrodes produces air bubbles in the liquid flowing through the flow path, and momentarily increases pressure due to an effect of gas-liquid two-phase flow or the like. In contrast to this, a gradual application of voltage makes it possible to suppress a regular increase in pressure. Further, making the average fine pore size of the porous separator 30 small makes it possible to reduce an effect of the increase in pressure. Because performing a pressure adjustment and a pressure difference adjustment between both the electrodes leads to an energy loss due to them, complicated structures of auxiliary equipment and control building, and an increase in costs, the effect of the increase in pressure is preferably reduced by adjusting the average fine pore size of the porous separator 30.

Next, a maximum value of the average fine pore size of the porous separator 30 will be explained. An area flow rate twice as high as a required volume flow rate at a current density of 200 mA/cm² is assumed to be 0.004 cc/min/cm². A maximum thickness of the porous separator 30 is assumed to be 500 μm. In a case of being thicker than 500 μm, the ion permeability deteriorates, which is not preferred. The porosity is assumed to be 0.5. The coefficient of viscosity is assumed to be 0.001 μPa·s of water. When a water-based electrolytic solution is used, a value lower than this is not assumed. A pressure difference between the anode part 10 and the cathode part 20 is assumed to be 1 kPa. A pressure difference of less than 1 kPa is not preferred from the viewpoint of gas diffusion. Further, due to a low pressure loss flow path, a depth and a width of the flow path are large, which causes a decrease in the reaction efficiency. Furthermore, liquid drops produced in the flow path by the reaction close the flow path and a uniform reaction on a reaction surface is prevented, which is not therefore preferred. A maximum average fine pore size of the porous separator 30 in this case is preferably 0.5 μm. A liquid passage exceeding the above-described conditions is not suitable for the porous separator 30. That is, the porous separator 30 preferably has the thickness of 500 μm and the average fine pore size of 0.5 μm or less.

Next, a minimum value of the average fine pore size of the porous separator 30 will be explained. An area flow rate (a liquid flow rate per a cross-sectional area) twice as high as a required volume flow rate at a current density of 1 A/cm$^2$ is assumed to be 0.02 cc/min/cm$^2$. In the electrochemical reaction at 2 A/cm$^2$ or more, a large amount of gaseous oxygen is produced in the anode 11 and a large amount of product gas is also produced in the cathode 23. When the electrochemical reaction is performed under such conditions, a large amount of gas moves through the porous separator 30 to cause a movement phenomenon (a crossover) of the gas between the anode 11 and the cathode 23, and gas components which have reacted with each other each re-react on a counter electrode to cause a phenomenon of a decrease in efficiency, which is not therefore preferred. A minimum thickness of the porous separator 30 is assumed to be 1 μm. Being less than 1 μm results in small membrane resistance but is not preferred from the viewpoints of manufacturing costs, manufacturability, assembly performance, strength, and the like. The porosity is assumed to be 0.5. The coefficient of viscosity is assumed to be 0.01 μPa·s of high-concentration potassium hydroxide. In a case of being larger than this, energy consumption of a liquid pump or use of powerful pump is required, and a cost increases, which is not preferred. The pressure difference between the anode part 10 and the cathode part 20 is assumed to be 2000 kPa. A reaction at 2000 kPa allows direct practical use for a post-stage chemical process and is preferred to contribute to efficiency improvement of the reaction. The pressure of more than 2000 kPa is not preferred from the viewpoints of pressure resistance and costs of members and cells. The minimum average fine pore size of the porous separator 30 in this case is preferably 0.005 μm. A liquid passage exceeding the above-described conditions is not suitable for the porous separator 30. That is, the porous separator 30 preferably has the thickness of 1 μm and the average fine pore size of 0.005 μm or more.

That is, it is preferable that the thickness of the porous separator 30 is 1 μm or more and 500 μm or less and the average fine pore size of the porous separator 30 is 0.005 μm or more and 0.5 μm or less. The thickness is more preferably 5 μm or more and further 10 μm or more. A small fine pore size is advantageous to formation of the gas-liquid separation. The smaller the average fine pore size is, the better performance of the gas-liquid separation becomes, and even though the pressure difference between the anode part 10 side (liquid phase side) and the cathode part 20 side (gas phase side) is large, the pressure difference to some extent allows the formation. Making the average fine pore size of the porous separator 30 small allows the porous separator 30 to be thin, allows the porosity to be high, and also allows the permeability of ions to increase, which is therefore preferred. The average fine pore size is more preferably 0.01 μm or more. The porous separator 30 is preferred to be thinner in order to secure the ion permeability and electrical resistance of a membrane. However, a required liquid is to be supplied by the reaction, and being too thin prevents the reaction. Further, a product of the thickness and the average fine pore size of the porous separator 30 is preferably 0.1 μm$^2$ or more and 50 μm$^2$ or less.

The average fine pore size of the porous separator 30 is calculated using processing software or the like by observation images with an optical microscope, an electron microscope, or the like. Further, the average fine pore size of the porous separator 30 may be calculated by a mercury intrusion method.

Since the pressure difference is about 1 to 2000 kPa, the formula of the pressure gradient is converted into a formula: $\nabla P = -\mu \times Q \times 180(1-\varepsilon^3)/d_m^2 \times \varepsilon^3 \times A$, and this value is preferably in a range of 1 to 2000 kPa. In considering the ion permeability, ε is considered to be in a range of 0.5 to 0.9, and at this time, it is preferable to satisfy a formula: $1 < -\mu \times Q \times 180(1-\varepsilon^3)/d_m^2 \times \varepsilon^3 \times A < 2000$.

Because it is very difficult to withstand a pressure of 2000 kPa, it is more preferable to be at least 200 kPa or less. Particularly in a case of not using a cell in the electrochemical reaction device to apply pressure, because the pressure difference is about 1 to 10 kPa at regular time, it is preferable to satisfy $1 < -\mu \times Q \times 180(1-\varepsilon^3)/d_m^2 \times \varepsilon^3 \times A(0.5 < \varepsilon < 0.9) < 10$. There are effects of air bubbles and liquid drops produced by the reaction, and in consideration of fluctuations of the pressure, or the like, it is preferable to be 2 kPa or more.

In the electrochemical reaction device according to the embodiment, by controlling at least two parameters of the average fine pore size, the product of the average fine pore size and the thickness, the thickness, the porosity, and the coefficient of permeability K of the porous separator 30, the pressure loss is controlled to form the gas-liquid separation. For example, when the thickness of the porous separator 30 is 10 μm or more and 500 μm or less, it is preferable that the average fine pore size of the porous separator 30 is larger than 0.008 μm and smaller than 0.45 μm and the porosity of the porous separator 30 is higher than 0.5. This makes it possible to increase the reaction efficiency while forming the gas-liquid separation.

Figure 6:
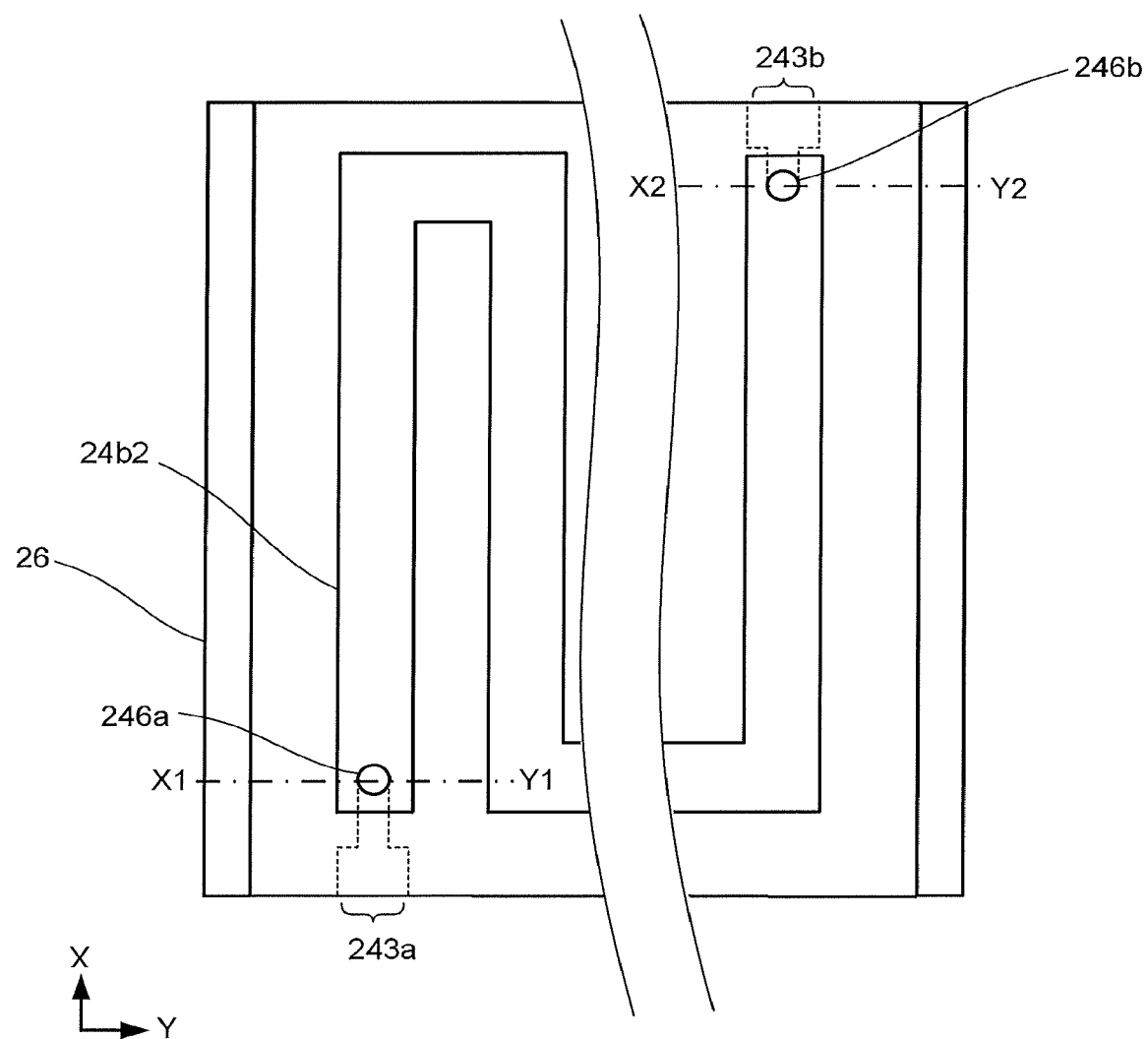
FIG. 6 is a schematic top view illustrating another structure example of the flow path plate.
Figure 7:
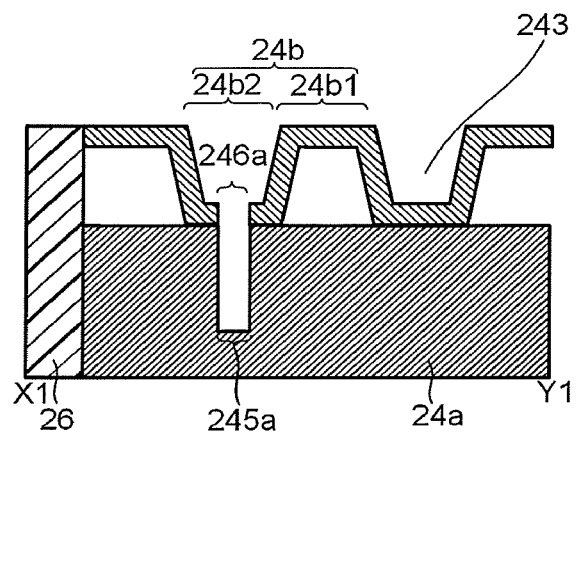
FIG. 7 is a schematic cross-sectional view illustrating another structure example of the flow path plate.
Figure 8:
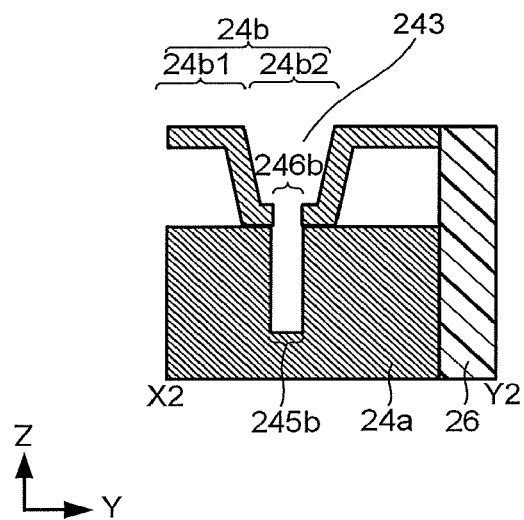
FIG. 8 is a schematic cross-sectional view illustrating another structure example of the flow path plate.

The structure of the flow path plate 24 is not limited to the structure examples illustrated in FIG. 1 to FIG. 4. FIG. 6 is a schematic top view of another structure example of the flow path plate 24. FIG. 7 is a schematic cross-sectional view of a line segment X1-Y1 in FIG. 6. FIG. 8 is a schematic cross-sectional view of a line segment X2-Y2 in FIG. 6. In FIG. 6 to FIG. 8, portions common to the structures illustrated in FIG. 1 to FIG. 4 can be assisted by the explanations in FIG. 1 to FIG. 4 as necessary.

The flow path plate illustrated in FIG. 6 to FIG. 8 includes a flow path layer 24a and a flow path layer 24b stacked on the flow path layer 24a. For the flow path layer 24a and the flow path layer 24b, high corrosion-resistant titanium, or the like can be used, but due to the relationship with press workability, price, or the like, working such as gold plating on a pressed plate of aluminum, SUS, or the like, conductive SUS for a high corrosion-resistant fuel cell, and the like may be used.

The flow path layer 24a includes the inflow port 243a, the outflow port 243b, an opening 245a, and an opening 245b. The inflow port 243a and the outflow port 243b are each provided to be exposed on a side surface of the flow path layer 24a.

The opening 245a penetrates the flow path layer 24a to communicate with the inflow port 243a. The opening 245b penetrates the flow path layer 24a to communicate with the outflow port 243b. The opening 245a and the opening 245b each may be formed by a groove.

The flow path layer 24b has a region 24b1 apart from the flow path layer 24a and a region 24b2 bent so as to project toward the flow path layer 24a from the region 24b1. The region 24b1 may have therein an opening through which the flow path layer 24b penetrates.

The region 24b2 has an opening 246a and an opening 246b. The opening 246a communicates with the inflow port 243a through the opening 245a. The opening 246b communicates with the outflow port 243b through the opening 245b.

In the flow path plate illustrated in FIG. 6 to FIG. 8, side surfaces of the flow path layer 24a and the flow path layer 24b are sealed by a sealing member 26. At this time, the flow path 243 contains a space between the region 24b2 and the porous conductive layer 23a of the cathode 23.

Figure 9:
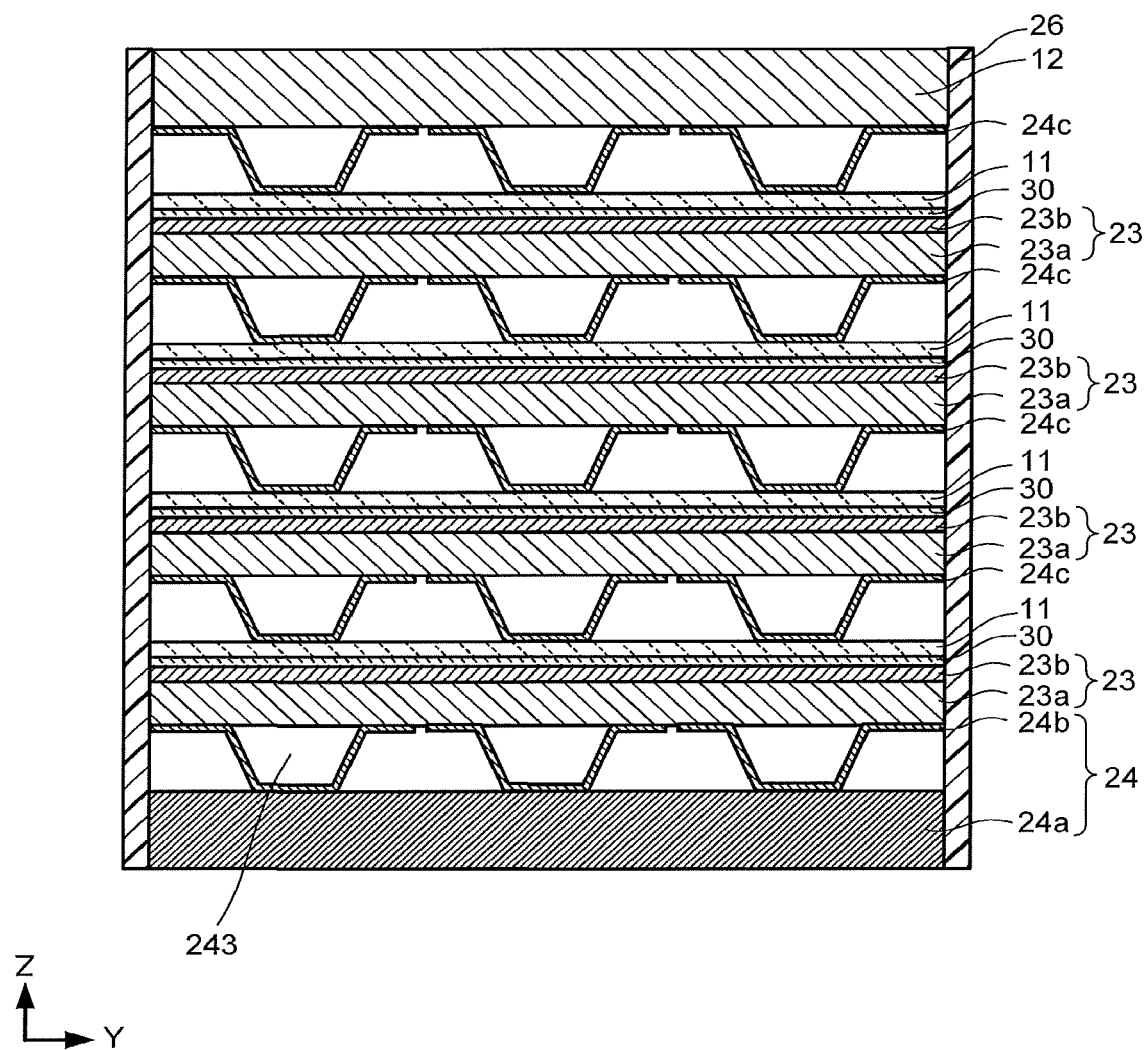
FIG. 9 is a schematic cross-sectional view illustrating another structure example of the flow path plate.

FIG. 9 is a schematic cross-sectional view illustrating another structure example of the electrochemical reaction device. The electrochemical reaction device illustrated in FIG. 9 includes a plurality of anodes 11, a flow path plate 12, a plurality of cathodes 23 each having a porous conductive layer 23a and a reduction catalyst layer 23b, a flow path plate 24 having a flow path layer 24a and a flow path layer 24b, a plurality of flow path layers 24c, a plurality of porous separators 30, and a sealing member 26. In FIG. 9, a plurality of units each including the anode 11, the cathode 23, the porous separator 30, and the flow path layer 24c are stacked. Parts common to the electrochemical reaction device explained with reference to FIG. 1 to FIG. 8 can be assisted by the explanations as necessary.

One of the anodes 11 is provided between one of the cathodes 23 and the flow path plate 12. One of the cathodes 23 is provided between the above-described one of the anodes 11 and one of the flow path plates 24c. One of the porous separators 30 separates the above-described one of the anodes 11 from the above-described one of the cathodes 23. One of the flow path layers 24c is provided between another of the cathodes 23 and the above-described one of the anodes 11. Further, though not illustrated, the plural anodes 11 and the plural cathodes 23 are electrically connected to a power supply 40.

The flow path plate 12 may be electrically connected to the power supply 40 via a current collector 13 similarly to the electrochemical reaction device illustrated in FIG. 1, for example. The porous conductive layer 23a faces the flow path layer 24c. The reduction catalyst layer 23b faces the porous separator 30.

The flow path layer 24a faces the porous conductive layer 23a. The flow path layer 24a may be electrically connected to the power supply 40 via a current collector 25 similarly to the electrochemical reaction device illustrated in FIG. 1, for example. The flow path layer 24b is stacked on the flow path layer 24a. A region 24b1 of the flow path layer 24b has therein an opening through which the flow path layer 24b penetrates. For the flow path layer 24c, a flow path layer having the same structure as the flow path layer 24a, for example, can be used. Further, the electrochemical reaction device may have a structure in which the openings 246a, 246b of the flow path layer 24a are not provided and the region 24b2 extends to an end portion of the flow path layer 24c. At this time, carbon dioxide or an electrolytic solution may be directly supplied to the flow path 243 from the end portion of the flow path layer 24c. The flow path layer 24c is also referred to as a bipolar plate. Further, the sealing member 26 seals a stack of the above-described units.

In the electrochemical reaction device illustrated in FIG. 9, an electrolytic solution on the anode 11 side and an electrolytic solution on the cathode 23 side can be made common, and further flow paths through which the electrolytic solution flows can be made common. For example, the same flow path layer 24c can be used as the flow path on the anode 11 side and the flow path on the cathode 23 side, and can also be used as a flow path on the cathode 23 side by having openings formed therein like the aforementioned flow path. Such a formation is preferred because the contact resistance between the anode 11 and the cathode 23 is reduced to improve the efficiency. Further, this formation is good because a cost reduction and a reduction in size and weight can be achieved by reducing the number of parts.

EXAMPLE

Example 1

A cell of an electrochemical reaction device in this example was fabricated as follows. An anode was formed by forming an oxidation catalyst containing an iridium oxide on a surface of a titanium-made wire mesh having a mesh structure formed by etching. Further, a cathode was fabricated by spraying 23 mass % of gold-carrying carbon onto a stack composed of a first porous conductive layer and a second porous conductive layer formed of a carbon paper to form a catalyst layer-attached carbon paper with a gold-carrying amount being 0.2 mg/cm$^2$. A structure (catalyst area 400 mm$^2$) was fabricated by sandwiching the anode and the cathode in a porous separator (a PTFE membrane subjected to hydrophilic treatment (also referred to as a hydrophilic PTFE membrane), average fine pore size 0.1 μm, thickness 60 μm, porosity 0.7) manufactured by Sumitomo Electric Industries, Ltd. Note that the average fine pore size was measured from observation images with an electron microscope.

A flow path plate on the cathode side was formed of titanium. A flow path meanders so as to make five turnbacks. At a turned portion of the flow path, the flow path branches off into two in parallel connection. The number of branches at the turned portion is defined as a branch number, some of the branches including a confluence. L3 was 19 mm, L9 was 0.4 mm, L6 was 1.5 mm, L8 was 2.0 mm, L10 was 0.5 mm, and L11 was 0.7 mm. An overlapped portion of the anode and the cathode was 6 cm$^2$.

A flow path plate on the anode side was formed of titanium. A flow path meanders so as to make four turnbacks. At a turned portion of the flow path, the flow path branches off into two in parallel connection. The others are formed similarly to a structure of a flow path plate on the cathode side.

As an electrolytic solution, a 1.0 M potassium hydroxide solution was supplied to the flow path on the anode side at a flow rate of 0.6 sccm. A carbon dioxide gas was supplied to the flow path on the cathode side at a flow rate of 30 sccm. A 2.3 V voltage was applied between the anode and the cathode to collect gas generated from the cathode side, to then measure conversion efficiency of the carbon dioxide. The generated gas was sampled and the quantity of the gas was identified and determined by gas chromatography. A current flowing through the cathode side and a current density, and a partial current of each of produced hydrogen and carbon monoxide on this occasion were measured by an ammeter.

As a result, a total current value was 188 mA/cm$^2$ at an initial stage and 175 mA/cm$^2$ after one hour. When Faraday's efficiency was calculated from the gas chromatography and a cell outlet flow rate, carbon monoxide was 97.8% at an initial stage and 95.2% after one hour, and meanwhile, hydrogen was 1.4% at an initial stage and 1.7% after one hour. When a partial current density of carbon monoxide production was calculated, it was 183 mA/cm² at an initial stage and 167 mA/cm² after one hour.

A pressure loss of the porous separator was calculated. Water at 0.036 cc/min is assumed to be moved through the porous separator twice as much as the amount of water required for reacting at 200 A/cm² in a 4 cm square. When a coefficient of viscosity was 0.001 µPa·s, a thickness was 60 µm, and an average fine pore size was 0.1 µm, the pressure loss was 17 kPa, and was a value allowing the gas-liquid separation to be sufficiently formed. K at this time was $3.5 \times 10^{18}$.

Comparative Example 1

A cell of an electrochemical reaction device with a structure similar to that in Example 1 except to sandwich the anode and the cathode in Example 1 in an ion exchange membrane (Nafion 115, 6 cm square) was fabricated, and similar measurement was performed.

As a result, a total current value was 65 mA/cm² at an initial stage and 63 mA/cm² after one hour. When Faraday's efficiency was calculated from the gas chromatography and a cell outlet flow rate, carbon monoxide was 89% at an initial stage and 91% after one hour, and meanwhile, hydrogen was 7% at an initial stage and 5% after one hour. When a partial current density of carbon monoxide production was calculated, it was 58 mA/cm² at an initial stage and 57 mA/cm² after one hour. This confirmed that the cell in Comparative example 1 had reaction efficiency lower than that in Example 1.

Comparative Example 2

A cell of an electrochemical reaction device with a structure similar to that in Example 1 except to sandwich the anode and the cathode in Example 1 in a porous separator (a PTFE membrane subjected to hydrophilic treatment, average fine pore size 0.45 µm, thickness 30 µm, porosity 0.7) manufactured by Sumitomo Electric Industries, Ltd. was fabricated, and similar measurement was performed.

As a result, the gas-liquid separation was not able to be performed sufficiently, and an electrolytic solution moved to a cathode side. A current value was not stabilized, and a stable electrochemical reaction was not able to be performed. This indicates that a catalyst is not effectively used due to a liquid which has passed through the porous separator and produced air bubbles. A total current value was from 50 mA/cm² to 100 mA/cm². Faraday's efficiency deteriorated, and hydrogen was produced up to 60% or more. This is considered because water which has passed through the porous separator affects a catalyst layer of the cathode and creates a water-rich environment to thereby increase hydrogen production. As described above, it was confirmed that the stable electrochemical reaction was difficult when the porous separator was thin and had the average fine pore size of 0.45 µm.

A pressure loss of the porous separator was calculated. Water at 0.018 cc/min is assumed to be moved through the porous separator twice as much as the amount of water required for reacting at 100 A/cm² in a catalyst area of 400 mm². When a coefficient of viscosity was 0.001 µPa·s, a thickness was 30 µm, and an average fine pore size was 0.45 µm, the pressure loss was 0.2 kPa. Accordingly, because of being 1 kPa or less, formation of the gas-liquid separation was difficult. K at this time was $7.1 \times 10^{-17}$.

Comparative Example 3

A cell of an electrochemical reaction device with a structure similar to that in Example 1 except to sandwich the anode and the cathode in Example 1 in a porous separator (a PTFE membrane subjected to hydrophilic treatment, average fine pore size 0.2 µm, thickness 35 µm, porosity 0.5) manufactured by Sumitomo Electric Industries, Ltd. was fabricated, and similar measurement was performed.

As a result, the gas-liquid separation was not able to be performed sufficiently, and an electrolytic solution moved to a cathode side. A current value was not stabilized, and a stable electrochemical reaction was not able to be performed. This indicates that a catalyst is not effectively used due to a liquid which has passed through the porous separator and produced air bubbles. A total current value was from 50 mA/cm² to 105 mA/cm². Faraday's efficiency deteriorated, and hydrogen was produced up to 20% or more. This is considered because water which has passed through the porous separator affects a catalyst layer of the cathode and creates a water-rich environment to thereby increase hydrogen production. As described above, it was confirmed that the stable electrochemical reaction was difficult when the porous separator was thin and had the average fine pore size of 0.2 µm.

A pressure loss of the porous separator was calculated. Water at 0.018 cc/min is assumed to be moved through the porous separator twice as much as the amount of water required for reacting at 105 A/cm² in a catalyst area of 400 mm². When a coefficient of viscosity was 0.001 µPa·s, a thickness was 30 µm, and an average fine pore size was 0.2 µm, the pressure loss was 2.0 kPa. Despite being 1 kPa or more, because a pressure loss of a main flow path sometimes exceeds 1 kPa, the formation of the gas-liquid separation becomes difficult. K at this time was $2.8 \times 10^{-17}$. Further, in a case of a reaction condition at 50 mA/cm² in this reaction, when water at 0.009 cc/min is assumed to be moved through the porous separator twice as much as the amount of water required for the reaction, and similar measurement is performed, the pressure loss is calculated to be 0.6 kPa and variations in pressure make the formation of the gas-liquid separation further difficult. K at this time was $2.8 \times 10^{-17}$.

Comparative Example 4

A cell of an electrochemical reaction device with a structure similar to that in Example 1 except to prepare a structure (catalyst area 400 mm²) by sandwiching the anode and the cathode in Example 1 in a porous separator (a PTFE membrane subjected to hydrophilic treatment, average fine pore size 0.1 µm, thickness 100 µm, porosity 0.5) manufactured by Sumitomo Electric Industries, Ltd. was fabricated, and similar measurement was performed.

As a result, the gas-liquid separation was formed. A current value was 50 mA/cm² but was not stabilized, and a stable electrochemical reaction was not able to be performed. This is considered because water for the amount required for the reaction has not been obtained. Furthermore, it is considered that due to a large resistance of the porous separator, a sufficient current value has not been obtained at the same voltage. As described above, it was confirmed that the stable electrochemical reaction was difficult when the average fine pore size was 0.1 µm and the thickness was 100 µm.

When a pressure loss of this flow path is assumed to be 10 kPa, water at 0.0066 cc/min can be moved through the porous separator. This is calculated to be the amount of water required for reacting at 74 mA/cm² in the catalyst area of 400 mm², and the gas-liquid separation is formed, but the amount of water required for reacting in this reaction falls short. K at this time was $7 \times 10^{-18}$. Further, when a pressure loss of the porous separator was calculated, it was 2.6 kPa.

Comparative Example 5

A cell of an electrochemical reaction device with a structure similar to that in Example 1 except to prepare a structure (catalyst area 400 mm²) by sandwiching the anode and the cathode in Example 1 in a porous separator (a PTFE membrane subjected to hydrophilic treatment, average fine pore size 0.008 μm, thickness 30 μm, porosity 0.8) manufactured by Sumitomo Electric Industries, Ltd. was fabricated, and similar measurement was performed.

As a result, the gas-liquid separation was formed. On the other hand, a current value was small not to obtain even 0.3 mA/cm², and an electrochemical reaction was not able to be stably performed. This is because water for the amount required for the reaction has not been obtained. Furthermore, it is considered that due to a large resistance of the porous separator, a sufficient current value has not been obtained at the same voltage. As described above, it was confirmed that the stable electrochemical reaction was difficult when the average fine pore size was 0.008 μm and the thickness was 30 μm.

When a pressure loss is calculated twice as much as the amount of water required for a reaction at 100 A/cm², it is 1318 kPa, and if the reaction is intended to be made in a flow path at 10 kPa, a calculation is made to be the amount of water required for reacting at 0.8 mA/cm² in the catalyst area of 400 mm², and the gas-liquid separation is formed, but the amount of water required for reacting in this reaction largely falls short. K at this time was $4.4 \times 10^{-20}$.

Comparative Example 6

A cell of an electrochemical reaction device with a structure similar to that in Example 1 except to prepare a structure (catalyst area 400 mm²) by sandwiching the anode and the cathode in Example 1 in a porous separator (a PTFE membrane subjected to hydrophilic treatment, average fine pore size 0.6 μm, thickness 100 μm, porosity 0.6) manufactured by Sumitomo Electric Industries, Ltd. was fabricated, and similar measurement was performed.

As a result, the gas-liquid separation was not able to be performed sufficiently, and an electrolytic solution moved to a cathode side. A current value was not stabilized, and a stable electrochemical reaction was not able to be performed. This indicates that a catalyst is not effectively used due to a liquid which has passed through the porous separator and produced air bubbles. A total current value was from 50 mA/cm² to 100 mA/cm². Faraday's efficiency deteriorated, and hydrogen was produced up to 80% or more. This is considered because water which has passed through the porous separator affects a catalyst layer of the cathode and creates a water-rich environment to thereby increase hydrogen production. It was confirmed that the stable electrochemical reaction was difficult when the porous separator was thin and had the average fine pore size of 0.6 μm.

A pressure loss of the porous separator was calculated. Water at 0.018 cc/min is assumed to be moved through the porous separator twice as much as the amount of water required for reacting at 100 A/cm² in the catalyst area of 400 mm². When a coefficient of viscosity was 0.001 μPa·s, a thickness was 100 μm, and an average fine pore size is 0.6 μm, the pressure loss was 0.3 kPa. Accordingly, because of being 1 kPa or less, the formation of the gas-liquid separation is difficult. K at this time was $1.9 \times 10^{-16}$.

Table 1 presents a relationship between a parameter and a pressure loss of each of separators in Example 1 and Comparative examples 1 to 6. As can be seen from Table 1, by controlling at least two parameters of the average fine pore size, the thickness, the product of the average fine pore size and the thickness, the porosity, and the coefficient of permeability K of the separator, the pressure loss is controlled to form the gas-liquid separation, and at the same time the reaction efficiency can be increased.

TABLE 1

|  | Separator | | | | | |
| --- | --- | --- | --- | --- | --- | --- |
|  | Average Fine Pore Size (μm) | Thickness (μm) | Average Fine Pore Size × Thickness (μm²) | Porosity | Coefficient of Permeability K | Pressure Loss (kPa) |
| Example 1 | 0.1 | 60 | 6 | 0.7 | $3.5 \times 10^{-18}$ | 17 |
| Comparative Example 1 | — | — | — | — | — | — |
| Comparative Example 2 | 0.45 | 30 | 13.5 | 0.7 | $7.1 \times 10^{-17}$ | 0.2 |
| Comparative Example 3 | 0.2 | 35 | 7 | 0.5 | $2.8 \times 10^{-17}$ | 0.6 |
| Comparative Example 4 | 0.1 | 100 | 10 | 0.5 | $7.0 \times 10^{-18}$ | 2.6 |
| Comparative Example 5 | 0.008 | 30 | 0.24 | 0.8 | $4.4 \times 10^{-20}$ | 1318 |
| Comparative Example 6 | 0.6 | 100 | 60 | 0.6 | $1.9 \times 10^{-16}$ | 0.3 |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrochemical reaction device, comprising:
   an anode to oxidize a first substance;
   a first flow path facing the anode and through which a liquid containing the first substance flows;

a cathode to reduce a second substance;
a second flow path facing the cathode and through which a gas containing the second substance flows; and
a porous separator provided between the anode and the cathode,
wherein a thickness of the porous separator is 1 µm or more and 500 µm or less,
an average fine pore size of the porous separator is larger than 0.008 µm and smaller than 0.45 µm, and
a porosity of the porous separator is higher than 0.5,
wherein the cathode includes:
a porous conductive layer having a first surface and a second surface; and
a reduction catalyst layer having a third surface on the first surface and containing a reduction catalyst configured to reduce the second substance,
wherein an area of the second surface is larger than an area of the third surface,
wherein the second flow path faces the second surface,
wherein the porous conductive layer has water repellency, and
wherein the porous separator is hydrophilic.

2. The device according to claim 1, wherein a coefficient of permeability of the porous separator is $1.7 \times 10^{-20}$ m$^2$ or more and $1.7 \times 10^{-16}$ m$^2$ or less.

3. The device according to claim 1, wherein the porosity is 0.7 or more.

4. The device according to claim 1, wherein the liquid contains water, and
the gas contains carbon dioxide.

5. The device according to claim 1, wherein the porous separator contains polytetrafluoroethylene.

6. The device according to claim 1, wherein the porous separator contains hydrophilic polytetrafluoroethylene.

7. The device according to claim 1, wherein the porous separator has a first face facing the anode and a second face facing the cathode,
a pressure gradient ∇P between the first and second faces is represented by
a formula: $\nabla P = -\mu \times Q \times 180(1-\varepsilon^3)/d_m^2 \times \varepsilon^3 \times A$,
the µ represents a coefficient of viscosity of the liquid passing through the porous separator,
the Q represents a volume flow rate of the liquid passing through the porous separator,
the ε represents a porosity of the porous separator,
the $d_m$ represents an average fine pore size of the porous separator,
the A represents a sectional area of the porous separator, and
the ∇P is larger than 1 kPa/m and smaller than 2000 kPa/m.

8. The device according to claim 7, wherein the ∇P is 2 kPa/m or more and 200 kPa/m or less.

9. The device according to claim 1, wherein a product of the thickness and the average fine pore size 0.1 µm$^2$ or more and 6 µm$^2$ or less.

10. The device according to claim 9, wherein the average fine pore size is 0.1 µm or more.

11. The device according to claim 9, wherein the thickness is 100 µm or less.

12. The device according to claim 1, further comprising:
a first flow path layer having an inlet and an outlet; and
a second flow path layer provided between the first flow path layer and the cathode and having a first region and a second region, the first region being apart from the first flow path layer, the second region being bent so as to protrude toward the first flow path layer from the first region, the second region having a first opening communicating with the inlet and a second opening communicating with the outlet,
wherein the cathode and the second region define the second flow path therebetween.

13. An electrochemical reaction device, comprising:
a first anode to oxidize a first substance;
a first flow path facing the first anode and through which a liquid containing the first substance flows;
a first cathode to reduce a second substance;
a second flow path facing the first cathode and through which a gas containing the second substance flows; and
a first porous separator provided between the first anode and the first cathode,
a second anode to oxidize the first substance;
a third flow path facing the second anode and through which the liquid flows;
a second cathode to reduce the second substance;
a fourth flow path facing the second cathode and through which the gas flows;
a second porous separator provided between the second anode and the second cathode;
a first flow path layer having an inlet and an outlet;
a second flow path layer provided between the first cathode and the first flow path layer and having a first region and a second region, the first region being apart from the first flow path layer, the second region being bent so as to protrude toward the first flow path layer from the first region, the second region having a first opening communicating with the inlet and a second opening communicating with the outlet, and the first region having a third opening through the second flow path layer; and
a third flow path layer provided between the first anode and the second cathode and having a third region and a fourth region, the third region being apart from the first anode, and the fourth region being bent so as to protrude toward the first anode from the third region, the third region having a fourth opening through the third flow path layer, and the fourth region having a fifth opening through the third flow path layer,
wherein:
the third region and the second cathode define the first flow path therebetween;
the first cathode and the second region define the second flow path therebetween;
a thickness of the first porous separator is 1 µm or more and 500 µm or less;
a average fine pore size of the first porous separator is larger than 0.008 µm and smaller than 0.45 µm;
a porosity of the first porous separator is higher than 0.5.

14. An electrochemical reaction device, comprising:
an anode to oxidize a first substance;
a first flow path facing the anode and through which a liquid containing the first substance flows;
a cathode to reduce a second substance;
a second flow path facing the cathode and through which a gas containing the second substance flows;
a first flow path layer having an inlet and an outlet;
a second flow path layer provided between the first flow path layer and the cathode and having a first region and a second region, the first region being apart from the first flow path layer, the second region being bent so as to protrude toward the first flow path layer from the first region, the second region having a first opening communicating with the inlet and a second opening communicating with the outlet; and a porous separator provided between the anode and the cathode, wherein the cathode and the second region define the second flow path therebetween, wherein a thickness of the porous separator is 1 μm or more and 500 μm or less, an average fine pore size of the porous separator is larger than 0.008 μm and smaller than 0.45 μm, and a porosity of the porous separator is higher than 0.5.

15. The device according to claim 14, wherein the cathode includes:
- a porous conductive layer having a first surface and a second surface; and
- a reduction catalyst layer having a third surface on the first surface and containing a reduction catalyst configured to reduce the second substance, and wherein the second flow path faces the second surface, and wherein an area of the second surface is larger than an area of the third surface.

* * * * *